United States Patent
Nomura

(10) Patent No.: US 7,584,049 B2
(45) Date of Patent: Sep. 1, 2009

(54) NAVIGATION METHOD, PROCESSING METHOD FOR NAVIGATION SYSTEM, MAP DATA MANAGEMENT DEVICE, MAP DATA MANAGEMENT PROGRAM, AND COMPUTER PROGRAM

(75) Inventor: Takashi Nomura, Zama (JP)

(73) Assignee: Xanavi Informatics Corporation, Zama-shi (JP)

( * ) Notice: Subject to any disclaimer, the term of this patent is extended or adjusted under 35 U.S.C. 154(b) by 466 days.

(21) Appl. No.: 10/521,327

(22) PCT Filed: Jul. 17, 2003

(86) PCT No.: PCT/JP03/09088

§ 371 (c)(1),
(2), (4) Date: Oct. 20, 2005

(87) PCT Pub. No.: WO2004/008073

PCT Pub. Date: Jan. 22, 2004

(65) Prior Publication Data

US 2006/0173614 A1 Aug. 3, 2006

(30) Foreign Application Priority Data

Jul. 17, 2002 (JP) ............................. 2002-208763

(51) Int. Cl.
*G01C 21/00* (2006.01)
*G08F 1/137* (2006.01)
*G06F 19/00* (2006.01)

(52) U.S. Cl. .................. 701/210; 701/208; 340/995.19; 717/168

(58) Field of Classification Search ................. 701/210, 701/200, 201, 211, 209; 717/168, 172, 173, 717/174; 715/810
See application file for complete search history.

(56) References Cited

U.S. PATENT DOCUMENTS

| | | | | |
|---|---|---|---|---|
| 6,075,467 A * | 6/2000 | Ninagawa | ............... | 340/995.14 |
| 6,230,098 B1 * | 5/2001 | Ando et al. | .................. | 701/208 |
| 6,304,885 B1 * | 10/2001 | Savage et al. | ............... | 715/273 |
| 6,453,233 B1 * | 9/2002 | Kato | ........................... | 701/208 |
| 6,546,334 B1 * | 4/2003 | Fukuchi et al. | ............. | 701/208 |
| 6,728,635 B2 * | 4/2004 | Hamada et al. | ............. | 701/211 |
| 6,823,255 B2 * | 11/2004 | Ahrens et al. | ............... | 701/200 |

FOREIGN PATENT DOCUMENTS

EP 1 221 587 A1 7/2002

(Continued)

OTHER PUBLICATIONS

European Search Report dated May 21, 2005 (Three (3) Pages).

*Primary Examiner*—Tan Q Nguyen
(74) *Attorney, Agent, or Firm*—Crowell & Moring LLP

(57) ABSTRACT

A navigation method for providing navigation by using map data includes: displaying a menu with which a user specifies an area of a map over which map data are to be updated, the menu containing a map-based option for area specification and a route-based option for area specification; obtaining update data along a route if the route-based option is selected from the options in the menu on display; and executing processing by using the obtained update data.

9 Claims, 21 Drawing Sheets

FOREIGN PATENT DOCUMENTS

| JP | 2000-36097 A | 2/2000 |
| JP | 2001-229369 A | 8/2001 |
| JP | 2002-48574 A | 2/2002 |
| JP | 2002-055601 | 2/2002 |
| JP | 2002-107169 A | 4/2002 |
| JP | 2002-188927 A | 7/2002 |

* cited by examiner

FIG. 6

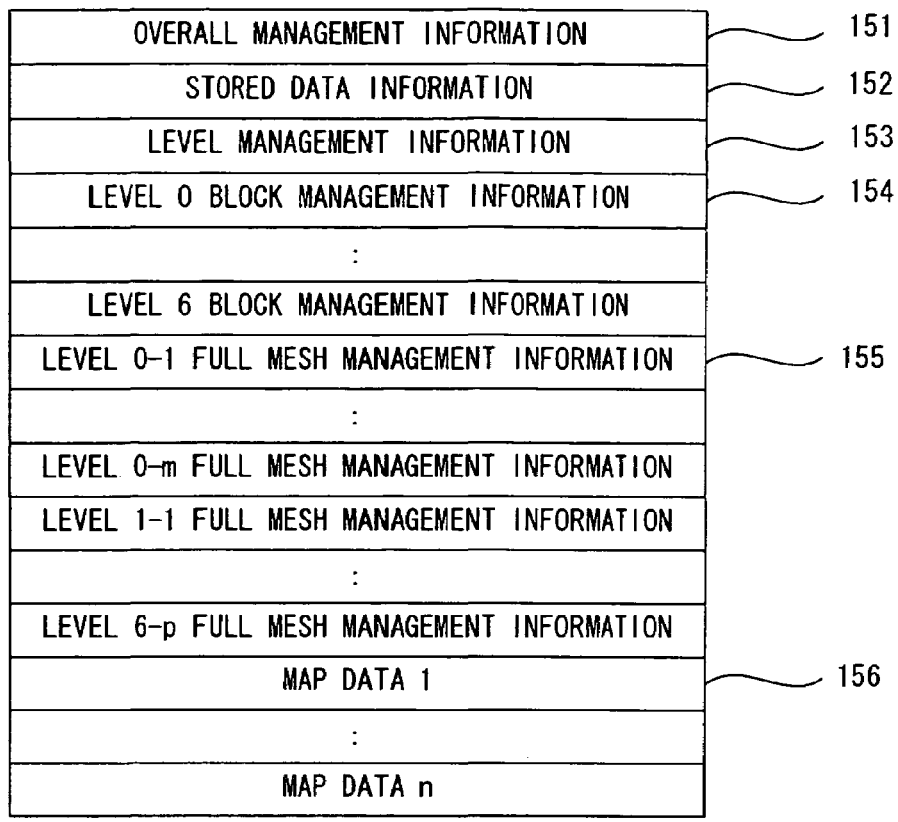

| OVERALL MANAGEMENT INFORMATION | 151 |
| LEVEL MANAGEMENT INFORMATION | 152 |
| STORED DATA INFORMATION | 153 |
| LEVEL 0 BLOCK MANAGEMENT INFORMATION | 154 |
| ⋮ | |
| LEVEL 6 BLOCK MANAGEMENT INFORMATION | |
| LEVEL 0-1 FULL MESH MANAGEMENT INFORMATION | 155 |
| ⋮ | |
| LEVEL 0-m FULL MESH MANAGEMENT INFORMATION | |
| LEVEL 1-1 FULL MESH MANAGEMENT INFORMATION | |
| ⋮ | |
| LEVEL 6-p FULL MESH MANAGEMENT INFORMATION | |
| MAP DATA 1 | 156 |
| ⋮ | |
| MAP DATA n | |

FIG. 7

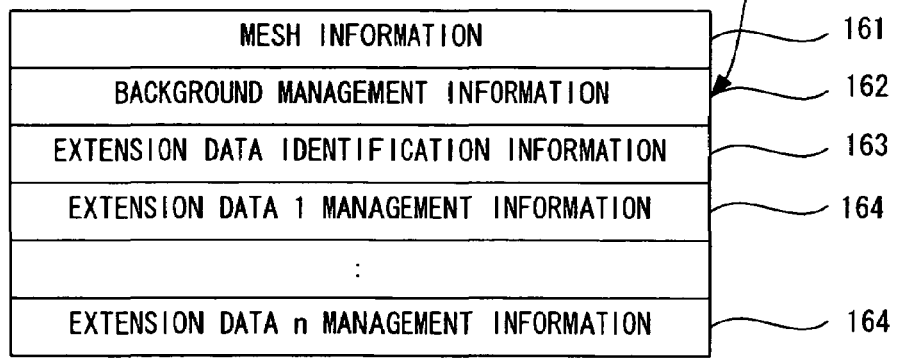

| MESH INFORMATION | 161 |
| BACKGROUND MANAGEMENT INFORMATION | 162 |
| EXTENSION DATA IDENTIFICATION INFORMATION | 163 |
| EXTENSION DATA 1 MANAGEMENT INFORMATION | 164 |
| ⋮ | |
| EXTENSION DATA n MANAGEMENT INFORMATION | 164 |

FIG. 8

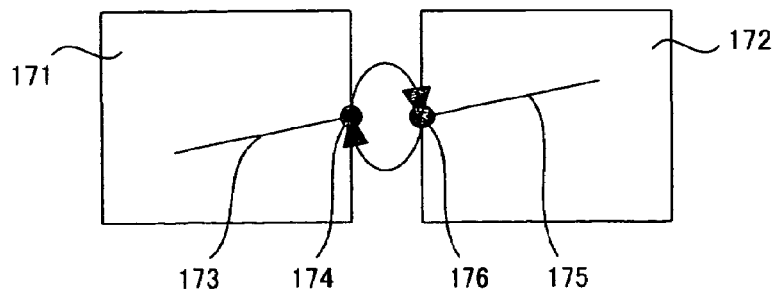

FIG.18
(a) REGULAR MAP SCREEN
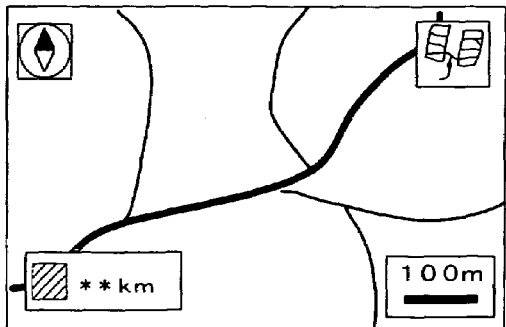
(b) SELECT DATA UPDATE MENU
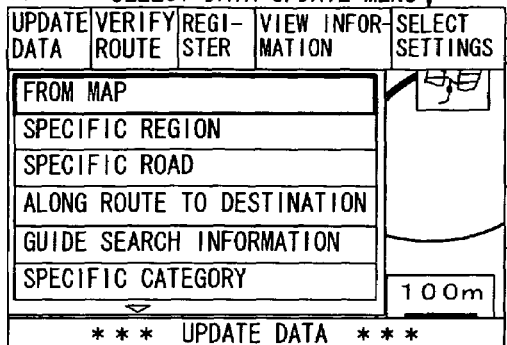
SELECT UPDATE DATA BASED UPON
(g) GUIDE SEARCH INFORMATION
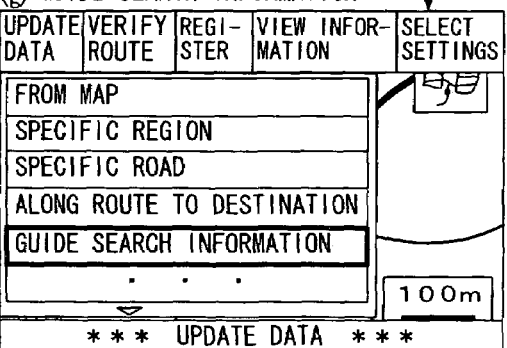
SELECT UPDATE DATA IN   TO FIG.23
(h) SPECIFIC CATEGORY
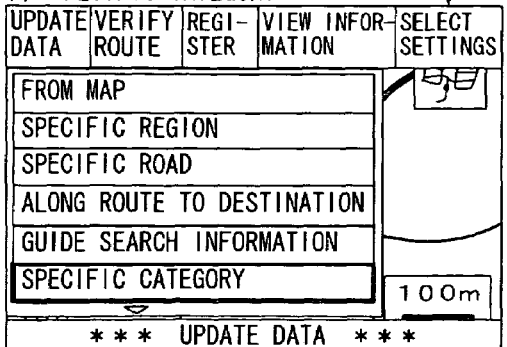
TO FIG.17
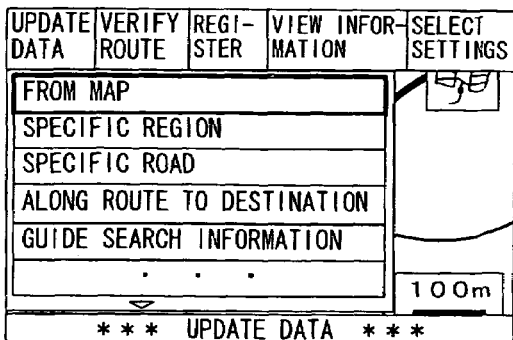
SELECT UPDATE DATA   TO FIG.19
(d) IN MAP ON DISPLAY
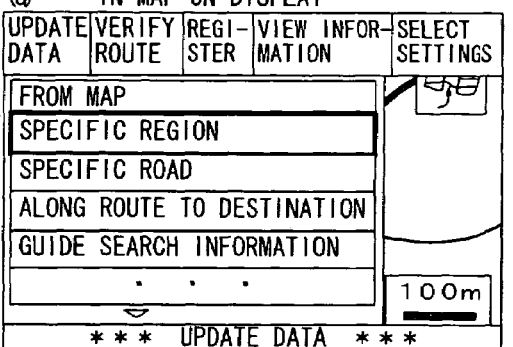
SELECT UPDATE DATA   TO FIG.20
(e) IN SPECIFIC REGION
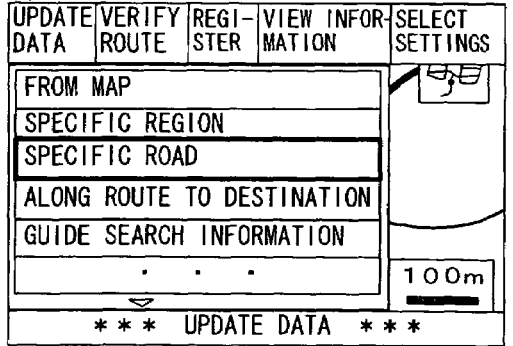
SELECT UPDATE DATA   TO FIG.21
(f) ALONG SPECIFIC ROAD
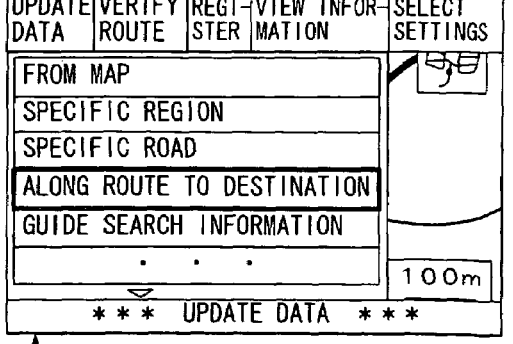
SELECT UPDATE DATA   TO FIG.22
ALONG SEARCHED ROUTE

| UPDATE DATA | VERIFY ROUTE | REGI-STER | VIEW INFOR-MATION | SELECT SETTINGS |

FROM MAP
SPECIFIC REGION
SPECIFIC ROAD
ALONG ROUTE TO DESTINATION
GUIDE SEARCH INFORMATION
. . .

100m

* UPDATE DATA *

SELECT "FROM MAP" →

(b)

| UPDATE DATA | VERIFY ROUTE | REGI-STER | VIEW INFOR-MATION | SELECT SETTINGS |

FROM MAP
FROM CURRENT MAP
FROM MAP OF JAPAN
. . .
. . .
. . .

100m

* UPDATE DATA *

SELECT "FROM CURRENT MAP"

(c)

| UPDATE DATA | VERIFY ROUTE | REGI-STER | VIEW INFOR-MATION | SELECT SETTINGS |

FROM MAP
FROM CURRENT MAP
FROM MAP OF JAPAN
. . .
. . .
. . .

SELECT CATEGORY
☐ BACKGROUND
■ ROAD
■ NETWORK
■ GUIDANCE
☐ GUIDE SEARCH    (OK)

* UPDATE DATA *

SELECT CATEGORY FOR DATA UPDATE AND THEN SELECT "OK"

(d)

DATA UPDATE STATUS

VOLUME · · kbyte

APPROX-
IMATELY · · SEC

UPDATE DATA?
YES    NO

SELECT "YES" TO UPDATE DATA (e)

DATA UPDATE IN PROGRESS

CANCEL

FIG.21

NAVIGATION METHOD, PROCESSING METHOD FOR NAVIGATION SYSTEM, MAP DATA MANAGEMENT DEVICE, MAP DATA MANAGEMENT PROGRAM, AND COMPUTER PROGRAM

INCORPORATION BY REFERENCE

The disclosures of the following priority applications are herein incorporated by reference:

Japanese Patent Application No. 2002-143111, filed May 17, 2002

Japanese Patent Application No. 2002-143112, filed May 17, 2002

Japanese Patent Application No. 2002-208763, filed Jul. 17, 2002

TECHNICAL FIELD

The present invention relates to a navigation method, a processing method to be adopted in a navigation system, a map data management apparatus, a map data management program and a computer program.

BACKGROUND ART

Map data of road maps and the like used in navigation systems are provided in a recording medium such as a CD ROM, a DVD-ROM or the like in the related art. In addition, map data are provided through communication to a navigation system installed in a vehicle.

However, a system that updates with a high degree of efficiency part of the map data with a large volume provided in a recording medium or the like and allows new and old map data to be used efficiently and with consistency is not provided in the related art.

The present invention provides a navigation method through which part of map data with a large volume provided in a recording medium or the like is updated with a high degree of efficiency, a processing method to be adopted in a navigation system, a map data management apparatus and the like.

A navigation method for providing navigation by using map data, according to the present invention, comprises: displaying a menu with which a user specifies an area of a map over which map data are to be updated, the menu containing a map-based option for area specification and a route-based option for area specification; obtaining update data along a route if the route-based option is selected from the options in the menu on display; and executing processing by using the obtained update data.

In this navigation method, it is preferred that: availability/unavailability of update data in individual map meshes along the route is displayed if the route-based option is selected from the options in the menu; the update data are obtained in response to a data update instruction; and the processing is executed by using the obtained map data.

Another processing method to be adopted in a navigation system that includes an input device, an output device having a display unit, a processing device and a recording medium, stores storage data including map data in the storage medium and provides navigation by using the storage data, according to the present invention, comprises: displaying a plurality of options including "road data" so as to enable specification of map data to be updated; displaying a plurality of roads if the "road data" are selected from the options on display; obtaining update data corresponding to a specific road selected from the roads on display; and executing processing by using the obtained data.

Another processing method to be adopted in a navigation system, which includes an input device, an output device having a display unit, a processing device and a recording medium, stores storage data including map data in the storage medium and displays route information with regard to a route from a current position to a destination by using the storage data, according to the present invention, comprises: displaying a plurality of options including "road data" so as to enable specification of map data to be updated; displaying a plurality of roads along a route if the "road data" are selected from the options on display; obtaining update data corresponding to a specific road selected from the roads on display; and executing processing by using the obtained data.

Another processing method to be adopted in a navigation system, which includes an input device, an output device having a display unit, a processing device and a recording medium, stores storage data including map data in the storage medium and displays route information with regard to a route from a current position to a destination by using the storage data, according to the present invention, comprises: displaying a plurality of options including road data so as to enable specification of map data to be updated; displaying a plurality of roads related to a route and availability/unavailability of data to be used for an update if the road data are selected from the options on display; obtaining update data corresponding to a specific road selected from the roads on display; and executing processing by using the obtained data.

Another navigation method for providing navigation by using map data, according to the present invention, comprises: displaying a menu with which a user specifies an area of a map over which map data are to be updated, the menu containing options that enable category-based area specification; obtaining update data based upon a specific category selected from the options in the menu on display; and executing processing by using the obtained update data.

A map data management apparatus connected via a communication network with a navigation system that uses map data stored in a fixed recording medium and update map data downloaded thereto in combination, according to the present invention, comprises: a map data management means that manages map data so that a memory volume does not exceed a predetermined maximum value and handles meshes with history information to be used to determine update statuses of individual sets of data as management units of the map data; and an update data providing means that searches for an area in which relevant map data corresponding to a data update request issued from the navigation system belong, in units of individual meshes and provides update data together with the history information.

A map data management program to be used in a navigation system that uses map data stored in a fixed recording medium and update map data downloaded from a map data management apparatus in combination, according to the present invention, comprises: a step of prompting a selection in a map data update menu prepared in advance, obtaining an input indicating the selection and displaying a specific area for a data update; and a step of prompting an input of at least one selected option in an update category menu prepared in advance and using the update map data in the specific area based upon the input of the selected option.

Another map data management program to be used in a navigation system that uses map data stored in a fixed recording medium and update map data downloaded from a map data management apparatus in combination, according to the present invention, comprises: a step of executing a route search and displaying route information indicating a route from a current position or a start point to a destination on a map; and a step of prompting an input of at least one selected option in an update category menu prepared in advance after the route information has been determined and reflecting the update map data in the route information displayed on the map based upon the input of the selected option.

Another map data management program to be used in a map data management apparatus connected via a communication network with a navigation system that uses map data stored in a fixed recording medium and update map data downloaded from the map data management apparatus in combination, according to the present invention, comprises: a step of handling reference meshes managed in a smallest possible fixed size allowed in relation to a memory capacity and having history information used to determine update statuses of individual sets of data as management units of the map data; and a step of searching for an area in which relevant map data corresponding to a data update request issued from the navigation system belong in units of the individual reference meshes and providing update data together with the history information.

A computer program executed in a navigation system that uses map data, according to the present invention, comprises: a step of displaying a "region" option and a "road" option to enable specification of map data to be updated, displaying prefectures and cities to enable specification of a region if the "region" option is selected and allowing specification of an area for a data update through a further selection made from display contents; a step of displaying a plurality of roads if the "road" option is selected and allowing specification of an area for a data update through a further selection made from the roads on display; and a step of obtaining update data corresponding to the specified area and executing processing by using the obtained update data.

Another computer program executed in a navigation system that uses map data, according to the present invention, comprises: a step of displaying route information indicating a route from a current position to a destination; a step of displaying availability/unavailability of update information related to the route information; and a step of executing processing based upon data obtained in response to an update instruction.

Another computer program executed in a navigation system that uses map data, according to the present invention, comprises: a step of displaying route information indicating a route from a current position to a destination; a step of displaying availability/unavailability of update information related to the route information in correspondence to individual meshes so that a mesh with update information is visually distinguishable from a mesh with no update information; and a step of executing processing based upon data obtained in response to an update instruction.

BRIEF DESCRIPTION OF THE DRAWINGS

FIG. 6 shows the structure of the main data file;

FIG. 7 shows the structure of the mesh internal management information;

FIG. 8 shows a single road that is present over adjacent meshes;

FIG. 18 is a screen transition diagram indicating how the screen display shifts during operation in the embodiment;

FIG. 19 is a screen transition diagram indicating how the screen display shifts during operation in the embodiment (when selecting data to be updated from the map on display);

FIG. 21 is a screen transition diagram indicating how the screen display shifts during operation in the embodiment (when selecting data to be updated along a specific road);

BEST MODE FOR CARRYING OUT THE INVENTION

Figure 1:
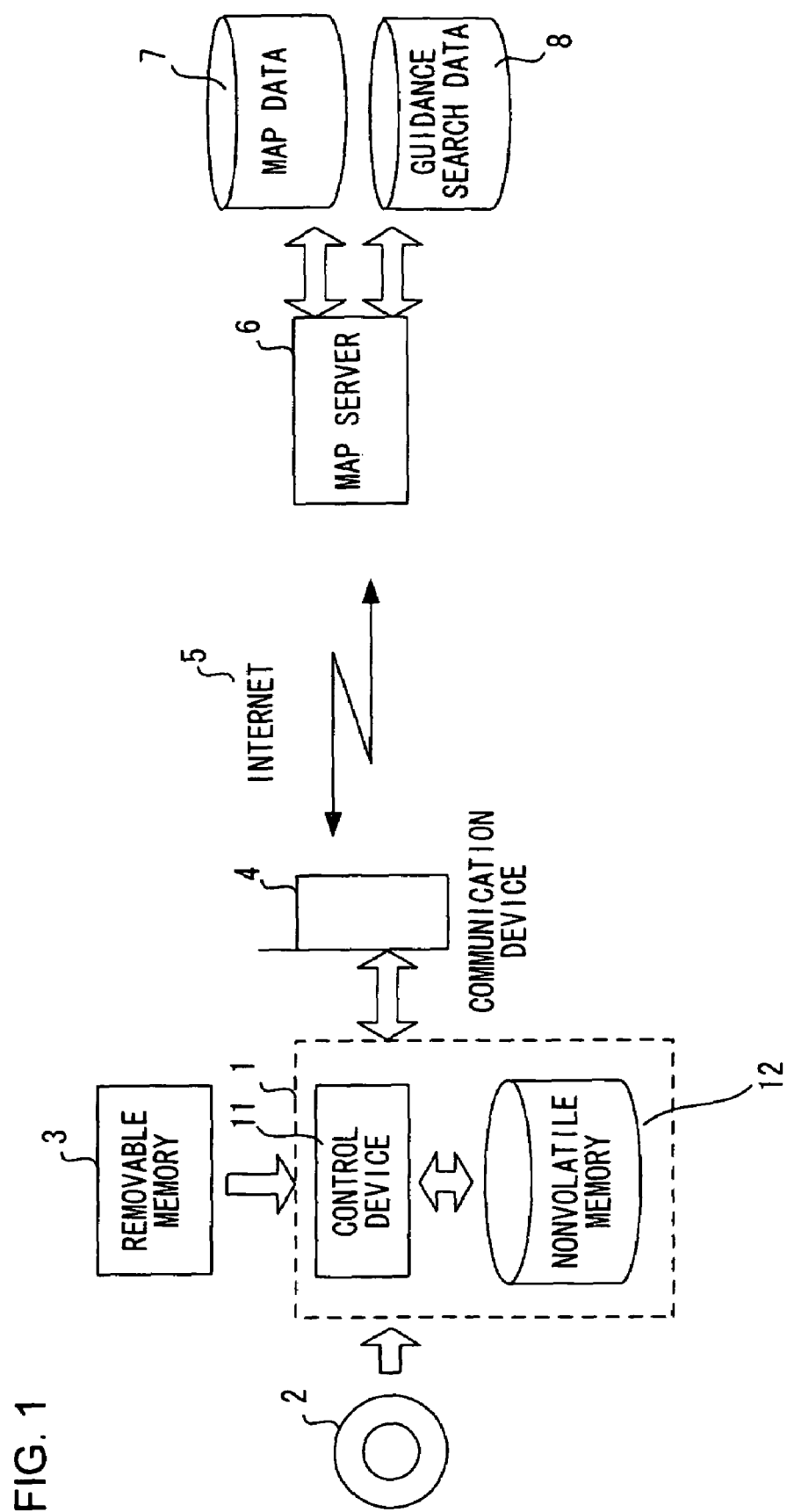
FIG. 1 shows how map data adopting the map data structure according to the present invention are exchanged.

FIG. 1 shows how map data adopting the map data structure according to the present invention are exchanged. An on-vehicle navigation system 1 reads map data, management information, guidance search data and the like from a recording medium 2 which may be a CD ROM or a DVD ROM. It receives update data to be used to update the map data and the like from a removable memory 3. The removable memory 3 is a detachable recording medium having recorded therein the update data or the like to be used to update part of the map data.

In addition, the navigation system 1 can be connected to a communication device 4 such as a portable telephone. The navigation system 1 can be connected to the Internet 5 via the communication device 4 and can be further connected with a map server 6 via the Internet 5. At the map server 6, map data from old versions up to and including the latest version of map data, are held at a map database 7, and guidance search data from old versions up to and including the most recent guidance search data, are held at a guidance search database 8. Thus, the map server 6 is capable of providing update data to be used to update part of the map data to the navigation system 1 via the Internet 5. It is to be noted that the guidance search data contain position information indicating the positions of POIs and the like and attribute information indicating the specific types, the names and the like of the POIs and the like.

The navigation system 1 includes a control device 11 and a nonvolatile memory 12. The control device 11 is constituted with a microprocessor and its peripheral circuits. The nonvolatile memory 12 is a nonvolatile memory such as a hard disk or a flash memory installed inside the navigation system 1. The nonvolatile memory 12 may be any type of storage device as long as data written therein are retained even when the power to the navigation system 1 is turned off.

Once the recording medium 2 is loaded into the navigation system 1, it remains loaded in the navigation system 1 until it is replaced with a new recording medium 2. Accordingly, it may be referred to as a fixed medium as opposed to the removable memory 3. The map database 7 and the guidance search database 8, which hold all the versions of map data and guidance search data, from the oldest to the most recent, are databases holding mother data. Using the data at the map database 7 and the guidance search database 8, the map server 6 can prepare a recording medium 2 having recorded therein initial (pre-update) map data or a removable memory 3 having stored therein update data to be used for data update.

Figure 2:
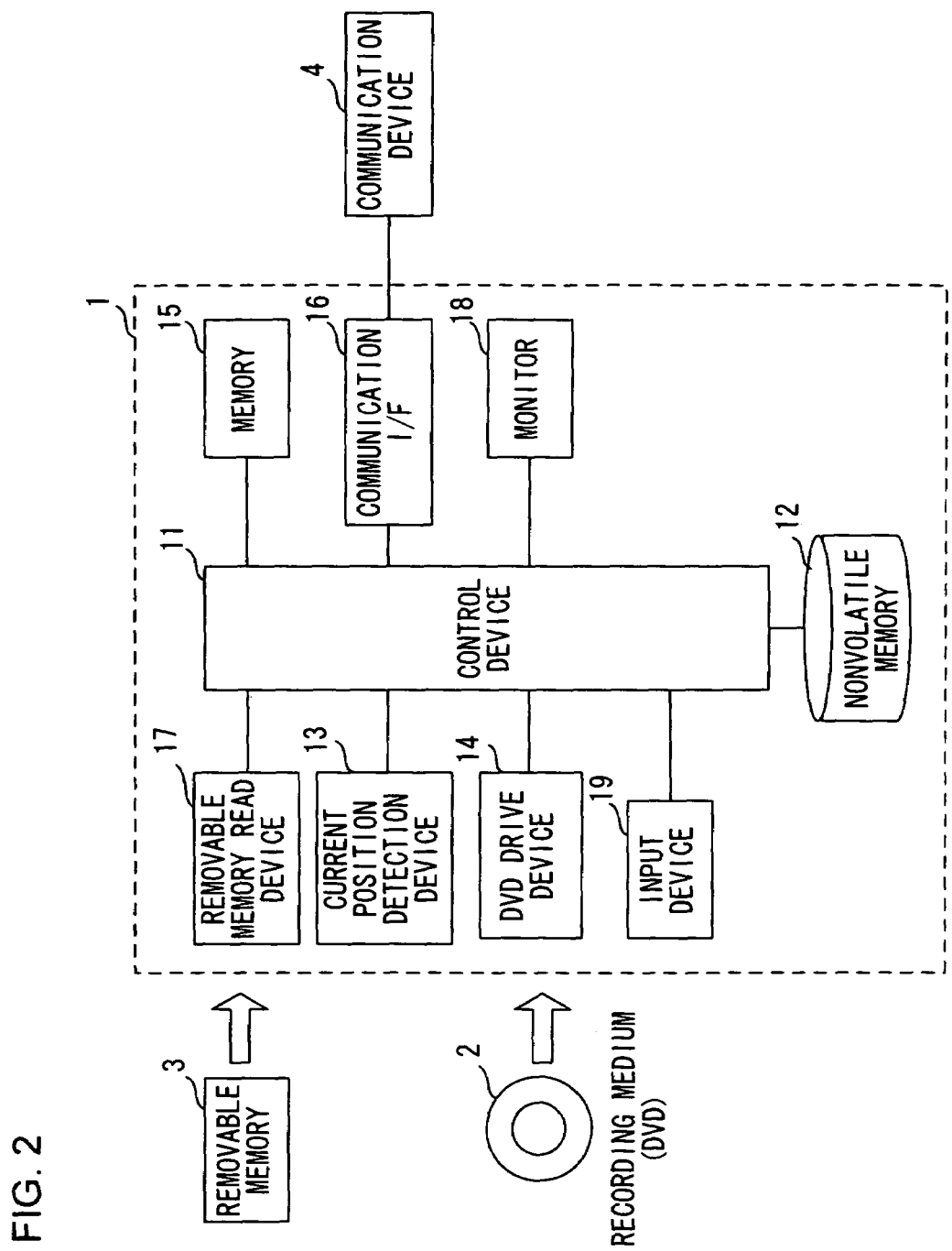
FIG. 2 is a block diagram of an on-vehicle navigation system.

FIG. 2 is a block diagram of the on-vehicle navigation system 1. The navigation system 1 comprises the control device 11, the nonvolatile memory 12, a current position detection device 13, a DVD drive device 14, a memory 15, a communication interface 16, a removable memory read device 17, a monitor 18 and an input device 19.

The current position detection device 13, which detects the current position of the vehicle, may be constituted with, for instance, an azimuth sensor that detects the advancing azimuth of the vehicle, a vehicle speed sensor that detects the vehicle speed, a GPS sensor that detects a GPS signal transmitted from a GPS (global positioning system) satellite and the like. The DVD drive device 14 reads map data and the like in the recording medium 2 loaded therein. In the embodiment, the recording medium 2 is a DVD ROM. However, the recording medium 2 may be a CD ROM or another type of recording medium.

The memory 15 is used to store the vehicle position information detected with the current position detection device 13 and the like and also to store node information, link information and the like of the nodes and the links on a recommended route calculated by the control device 11. In addition, full mesh management information which is to be detailed later is stored in the memory 15. The memory 15 constitutes a working area of the control device 11. The communication interface 16 is used to achieve a connection with the communication device 4. The use of a portable telephone and an Internet connection are enabled via the communication interface 16. Data in the removable memory 3 can be read with the removable memory read device 17 at which the removable memory 3 is loaded.

The monitor 18 is a display device at which a map, a recommended route and various types of information are displayed. The monitor 18 may be provided as an integrated part of the navigation system main unit or it may be provided as a separate casing. In addition, the monitor 18 disposed at an isolated position may be connected to the navigation system main unit through a cable or the like. Through the input device 19, the destination for the vehicle and the like are entered when conducting a route search. It may be constituted as a remote-control unit or it may be constituted as a touch panel disposed on the screen at the monitor 18. The control device 11 executes various types of navigation processing such as road map display, route search and route guidance by using the current vehicle position information detected with the current position detection device 13, the map data stored in the recording medium 2 or the nonvolatile memory 12. It is to be noted that a program of the various types of processing executed by the control device 11 is installed in a ROM (not shown) provided inside the control device 11.

—Map Data Structure—

The data structure adopted in the map data mentioned above is now explained in further detail. The map data are information related to maps and include background (for map display) data, locator data, network (for route search) data and guidance data (information indicating intersecting point names, node names, directional terms, directional guidance facility information and the like). The background data are used to display a background of a road or a background in a road map. The locator data are used to specify the current vehicle position for map matching and the like. The network data, which are route search data constituted with branching information and the like not directly relevant to the specific road shapes, are mainly used when calculating a recommended route (when executing a route search). The guidance data include the names of intersecting point and the like, and are used to provide guidance for the driver or the like along the recommended route based upon the calculated recommended route.

The map data are managed based upon a concept that they are provided at different levels in blocks and meshes in the embodiment. In the embodiment, the map data are divided into seven different levels of data, with each level corresponding to a specific scaling factor. Level 0 corresponds to the scaling factor at which the map is provided with the most detail, and at level 6, the map is provided as the widest-area map. While the different levels of map data are provided at varying scaling factors, a common area is covered by the various levels of map data. Namely, supposing that the subject area is the entire nation of Japan, map data of the entire nation of Japan are provided at each level with a scaling factor different from the scaling factors corresponding to the other levels. For instance, at level 0, map data of the entire nation of Japan are provided at a scaling factor of $1/6250$, at level 3, map data of the entire nation of Japan are provided at a scaling factor of $1/400{,}000$, at level 4, map data of the entire nation of Japan are provided at a scaling factor of $1/1{,}600{,}000$, and at level 6, map data of the entire nation of Japan are provided at a scaling factor of $1/128{,}000{,}000$. In other words, seven sets of map data are provided in correspondence to levels 0 to 6.

Figure 3:
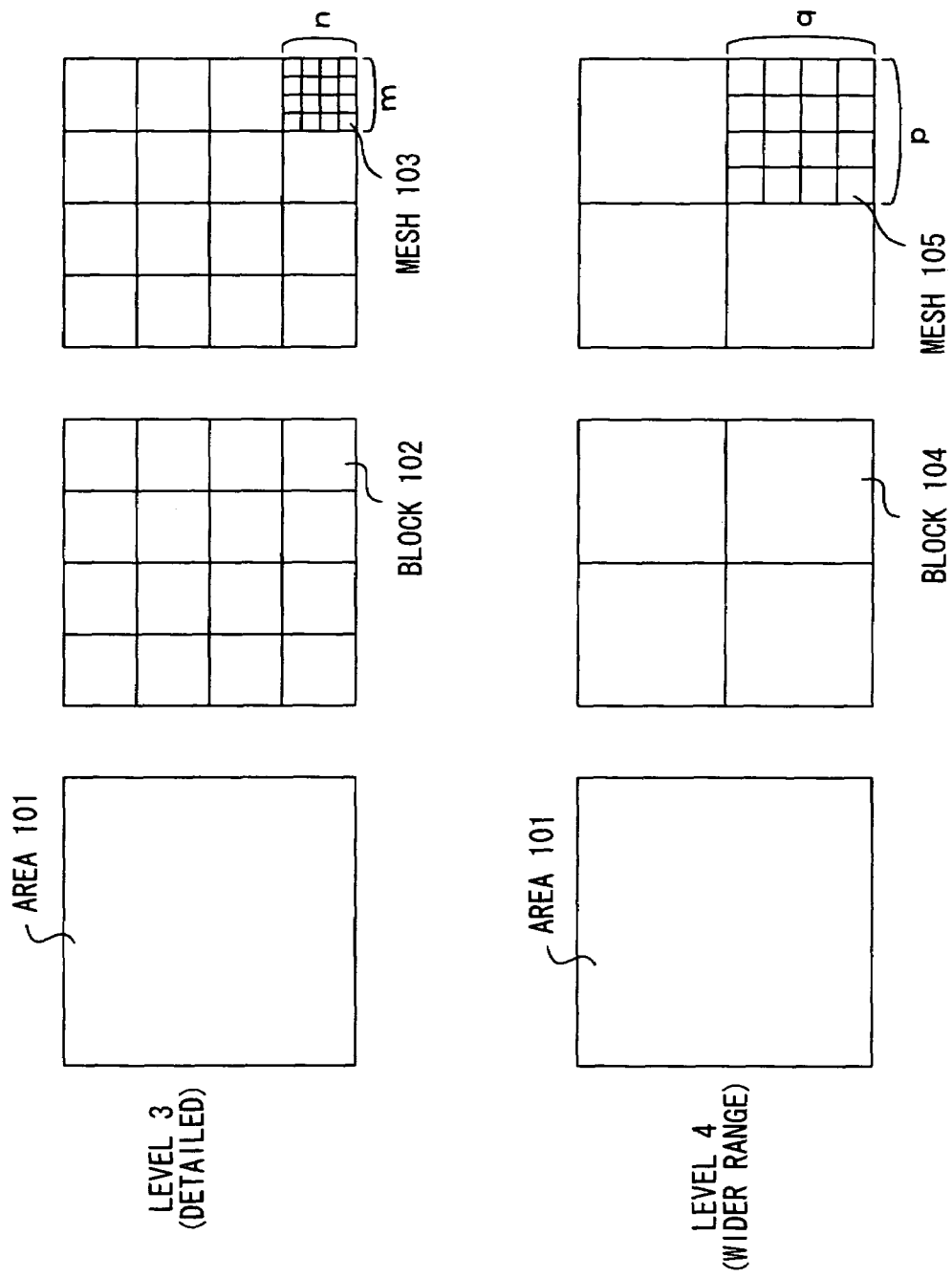
FIG. 3 is a conceptual diagram illustrating the relationships among the levels, the blocks and the meshes of the map data.

FIG. 3 is a conceptual diagram provided to facilitate an explanation of the relationships among the map data levels, blocks and meshes. FIG. 3 shows map data at levels 3 and 4 as an example. Reference numeral 101 indicates the subject area covered by the map data. Assuming that the map data cover the entire nation of Japan, the area 101 is a range that contains the entire nation of Japan. The same range of subject area is covered at levels 3 and 4. At level 3, the area 101 is managed as a plurality of blocks 102, i.e., 4×4=16 blocks. Each block 102 is divided into a plurality of meshes 103 and is managed with the meshes. In the embodiment, the data in the block are managed as m×n sets of mesh data. The blocks 102 of map data at the same level are each divided into m×n meshes.

At level 3, the area 101 is managed with a plurality of blocks 102, i.e., 2×2=4 blocks. Each block 104 is divided into a plurality of meshes 105 and is managed with the meshes. In the embodiment, the data in the block are managed as p×q sets of mesh data. The blocks 104 of map data at the same level are each divided into p×q meshes.

At levels 3 and 4, the area 101 is divided into different numbers of blocks and the individual blocks are divided into different numbers of meshes, since different volumes of data are handled at level 4 with a smaller scaling factor (a larger denominator) providing a wider area map and at level 3 with a larger scaling factor (a smaller denominator) providing a more detailed map compared to level 4. Namely, the map data are divided as appropriate in correspondence to the volume of data handled at each level. However, at a given level, the size of the individual blocks and the size of the individual meshes remain constant. It is to be noted that the numbers of blocks that the area 101 is divided into at the two levels in FIG. 3 simply represent an example and the area 101 may be divided into different numbers of blocks.

The terms "blocks" and "meshes" in this context are used for convenience in the explanation of the embodiment, and other terms may be used as well. Meshes may instead be referred to as parcels, or blocks may be referred to as first division units and meshes may be referred to as second division units. In addition, the blocks and meshes may be considered to be units obtained by geographically dividing the data.

Figure 4:
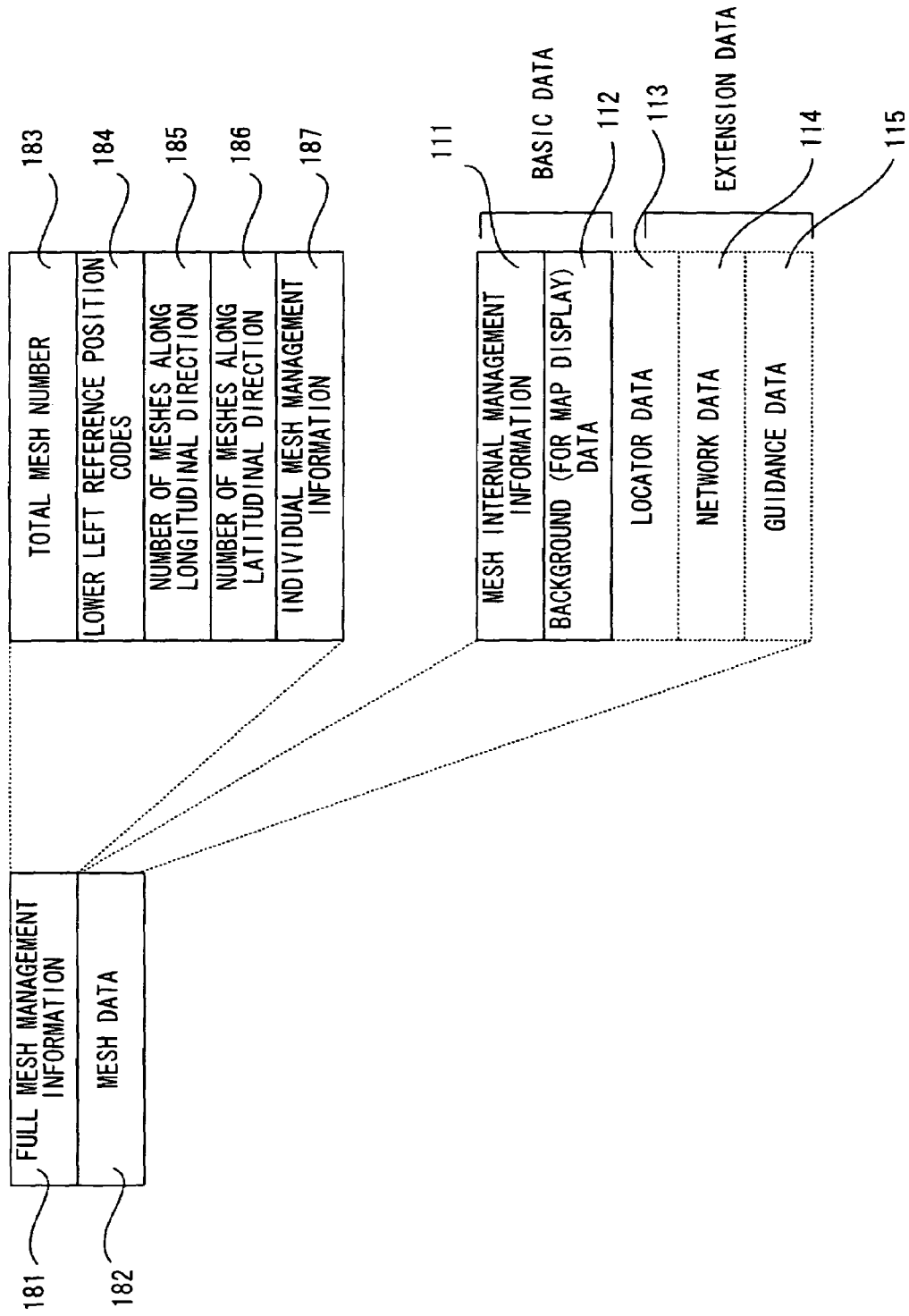
FIG. 4 shows the data structure assumed in one of the meshes in FIG. 3.

FIG. 4 shows the structure of full mesh management information 181 used to manage all the meshes in a block and the structure of mesh data 182. The mesh data 182 are map data provided in correspondence to each of the meshes 103 or 105 described earlier. The full mesh management information 181 includes management information for all the mesh data contained in the block, and is provided in correspondence to each block.

A total mesh number 183 in the full mesh management information 181 in FIG. 4 indicates the total number of meshes contained in the block. Position information related to the latitude and longitude of the lower left point of the block is entered as a lower left reference position code 184. A longitudinal mesh number 185 indicates the number of meshes set east to west along the longitudinal direction, and m is entered for the longitudinal mesh number 185 at level 3 in FIG. 3. A latitudinal mesh number 186 indicates the number of meshes set south to north along the latitudinal direction, and n is entered for the latitudinal mesh number 186 at level 3 in FIG. 3. Individual mesh management information 187 is used to manage individual sets of mesh data 182 and the number of sets of mesh management information 187 corresponds to the number of meshes in the block.

Each set of mesh data 182 is constituted with mesh internal management information 111, background (for map display) data 112, locator data 113, network (for route calculation) data 114 and guidance data 115. The mesh internal management information 111 and the background (for map display) data 112 constitute basic data, whereas the locator data 113, the network data 114 and the guidance data 115 constitute extension data. The basic data are included at all the levels of data. The mesh data at a given level contain specific extension data inherent to the level. For instance, the network data are contained in the data at levels 1, 2, 3 and 4, whereas the locator data and the guidance data are provided in the data at level 0. It is to be noted that address calculation data, image data, VICS data, building attribute data, peripheral area search data and the like may also be provided as extension data.

It is to be noted that the data are managed by setting an upper limit to the data size of the basic data in the embodiment. The data size upper limit may be set to, for instance, 32 KB. If the basic data size exceeds the upper limit value after updating map data, the excess data are managed as extension data. Let us consider a case in which a set of mesh data 182 initially contains 20 KB of basic data and 10 KB of extension data, the basic data alone are updated and the data size of the basic data increases to 40 KB as a result. The updated basic data are edited so as to keep the basic data size equal to or under 32 KB, and the excess 8 KB of basic data is managed as extension data. As a result, the size of the extension data increases to 18 KB, and the size of the overall mesh data 182 increases from 30 KB to 50 KB. If, on the other hand, the mesh data 182 initially contains 20 KB of basic data and 10 KB of extension data and the basic data alone are updated to increase the basic data size to 30 KB, the basic data size still does not exceed the upper limit 32 KB, and the additional 10 KB of basic data is held as part of the basic data. Thus, the size of the basic data after the update increases to 30 KB, the size of the extension data remains at 10 KB, and the size of the overall mesh data 182 increases from 30 KB to 40 KB. The upper limit is set for the data size of the basic data as described above for the following reason.

The navigation system 1 may be used for a number of years without installing additional memory under normal circumstances. For this reason, it is desirable to use a fixed size of map data, which matches the performance level of the navigation system 1 that is likely to be used for years. However, the volume of the map data is likely to increase over time as building shape data become more accurate, more detailed topographical data become available, and land development and rezoning take place. Accordingly, the map data adopt a structure which allows the map data to be updated in units of individual meshes in the embodiment.

When a new model navigation system comes onto the market, it usually has a greater memory capacity, a higher processing capability and the like. As a result, the volume of data that can be handled by the program increases, new functions are added or more detailed display becomes possible under normal circumstances. In this situation, the updated map data need to have a structure that allows the updated map data to be utilized commonly in the old navigation system and the new navigation system.

To satisfy the needs described above, the basic data are edited to maintain the data size which allows the basic data to be handled in the old navigation system as well as the new navigation system and the excess data are stored as extension data. In addition, data that are only needed in conjunction with a new function that cannot be used in the old type of navigation system, too, are stored as extension data.

The concept explained above by using the expression "old and new types of navigation systems" also applies to "general-purpose and high-performance" navigation systems or "portable and on-vehicle navigation systems" as well as "old and new" navigation systems. In other words, the structure of the map data achieved in the embodiment allows the map data to be utilized commonly in a system with a low processing capability and in a system with a high processing capability. The type of map data which is invariably utilized regardless of the level of the processing capability of the system is referred to as basic data. The upper limit to the size of the basic data is set in conformance to the memory size or the like of a system with the lowest processing capability. Since this makes it possible to commonly utilize the map data in the embodiment in systems with varying levels of processing capability, a higher degree of efficiency in map data management and a cost-reduction are achieved.

It is to be noted that the initial basic data, which are commonly used at varying levels of processing capability, may be regarded as high-priority data. The additional basic data resulting from an update, on the other hand, are background data to be used to display a more detailed map than the map displayed by using the initial basic data or nonessential, low priority background data that do not need to be displayed in the old model. It goes without saying that as long as the additional basic data can be managed as part of the basic data, the size of which is kept equal to or less than the upper limit, the additional basic data can be regarded as data with the same priority as the initial basic data.

No specific upper limit is set for the data size of the mesh data 182 in the explanation given above. However, an upper limit to the data size of the mesh data 182 may be set in correspondence to the capacity of the memory within the navigation system 1. For instance, the upper limit to the size of the mesh data 182 may be set to 128 KB. It is to be noted that values other than 32 KB and 128 KB may be set for the upper limits to the data sizes of the basic data and the mesh data 182, as well. The upper limits should be set to appropriate values by taking into consideration the initial performance level of the navigation system when the map data are originally defined, a subsequent improvement in the performance that is anticipated for the future and the like.

—Map Data Management in the Navigation System—

Figure 5:
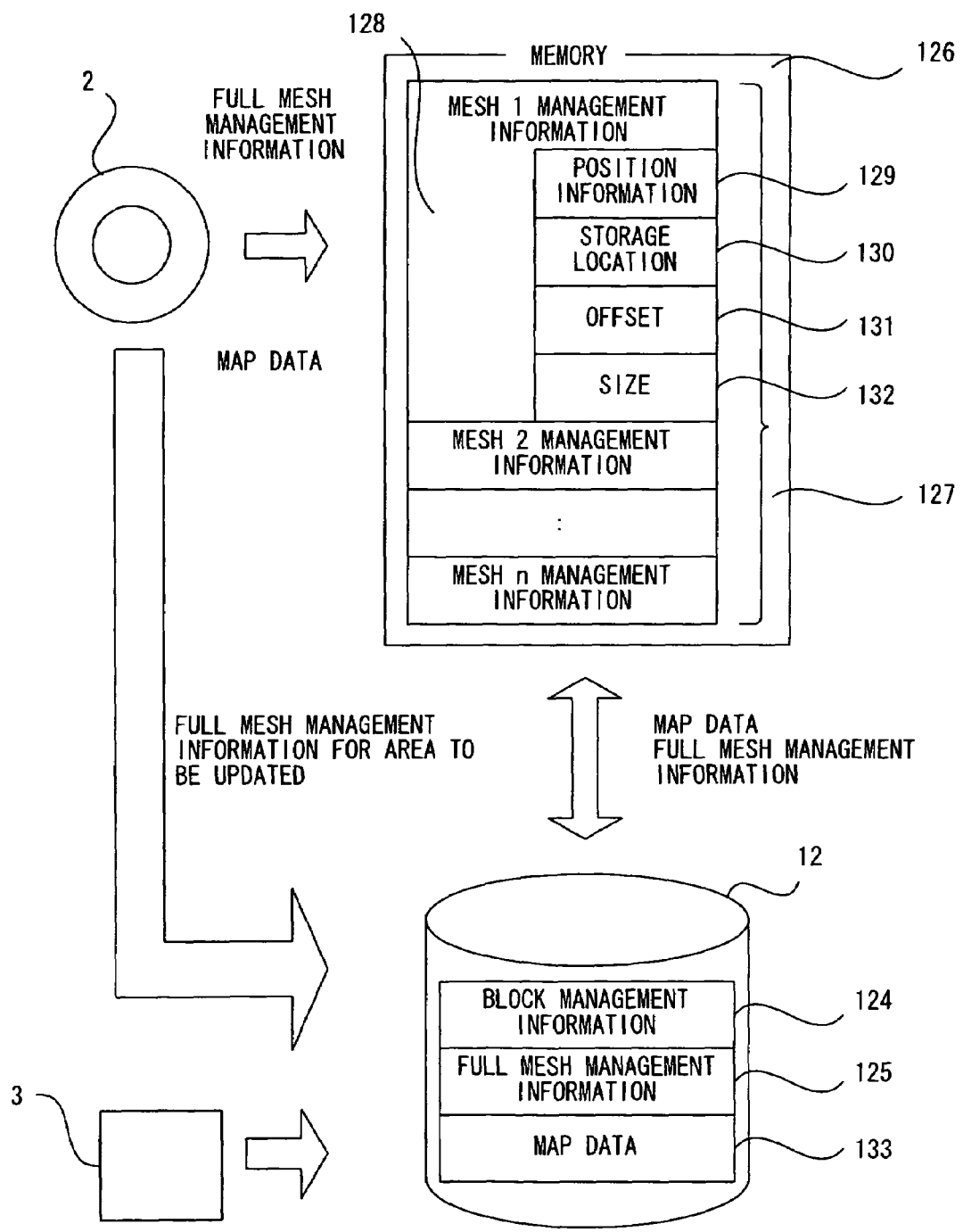
FIG. 5 illustrates how the map data are managed in the navigation system.

FIG. 5 shows how map data are managed in the navigation system 1. The navigation system 1 reads the full mesh management information and the map data from the recording medium 2, reads update map data from the removable memory 3 or from the map server 6 via the Internet 5, and is thus enabled to use the latest version of map data.

A navigation system in the related art reads data from a recording medium such as a CD ROM or a DVD-ROM alone. The navigation system achieved in the embodiment, on the other hand, uses the map data in the recording medium 2 and updated map data in combination. For this reason, it includes the nonvolatile memory 12 which is a read/write medium. The nonvolatile memory 12 is constituted of a hard disk or a flash memory, and data held in the nonvolatile memory 12 are retained even when the power to the navigation system is turned off. The nonvolatile memory 12 may be referred to as a cache medium 12 as well.

Block management information 124 is held at the nonvolatile memory 12. The block management information 124 includes identification information used to check whether the full mesh management information corresponding to the subject block is available in the recording medium 2 or in the nonvolatile memory 12. The initial value is set so as to indicate that all the full mesh management information corresponding to the individual blocks is available in the recording medium 2. As map data are updated in units of meshes, full mesh management information 125 corresponding to the block containing an updated mesh is prepared in the nonvolatile memory 12, and a value indicating that the full mesh management information for the block is available in the nonvolatile memory 12 is set in the block management information 124. The program is enabled to judge whether the full mesh management information is available in the recording medium 2 or in the nonvolatile memory 12 by first referencing the block management information 124.

Reference numeral 126 indicates a memory area where the full mesh management information is stored within the memory 15 of the navigation system. This memory area is hereafter referred to as the memory 126. After judging whether the full mesh management information is available in the recording medium 2 or in the nonvolatile memory 12, the program reads out the full mesh management information from the appropriate medium and stores the full mesh management information thus read out into the memory 126. The full mesh management information 127 read into the memory 126 includes mesh management information corresponding to meshes 1 through n. The mesh management information 128 contains position information 129, storage location data 130, offset data 131 and size data 132. The position information 129 indicates the position of the subject mesh represented by the latitude/longitude or the like of the mesh, whereas the storage location data 130 indicate whether the data are available in the recording medium 2 or in the nonvolatile memory 12. The offset data 131 indicate the position of the data in the medium (the recording medium 2 or the nonvolatile memory 12) and the size data 132 indicate the size of the map data.

After the map data in a given mesh are individually updated with the removable memory 3, the map data in the mesh are read into the nonvolatile memory 12 and are stored as map data 133. Thus, based upon the contents of the storage location data 130, the non-updated map data can be accessed at the recording medium 2 and the updated data can be accessed at the nonvolatile memory 12.

—Structure of Data in the Recording Medium—

Next, the data in the recording medium 2 are explained. A main data file is held in the recording medium 2. FIG. 6 shows the structure of the main data file. The main data file contains overall management information 151, stored data information 152, level management information 153, block management information 154, full mesh management information 155 and map data 156.

The overall management information 151 includes information related to the overall data, such as information on format version revisions, information on data version revisions, medium identification information, information on the data generation dates, information on the data generating parties and information on the areas covered by the data. The stored data information 152 indicates that types and the storage location of the data stored in the recording medium 2. The level management information 153 includes information on the hierarchical layer structure (the level structure) of the map data stored in the recording medium 2, information on the types of extension data attached to the data at the individual levels and information indicating the storage positions of the block management information. When map data are updated, the level management information 153 is copied into the non-volatile memory 12 and is used to change the storage location (the recording medium 2 or the non-volatile memory 12) of the block management information.

The block management information 154 includes management information used to manage the full mesh management information, such as assignment information indicating the assignment of the full mesh management information at the individual levels, information on the storage locations of the full mesh management information and information indicating the storage positions of the full mesh management information. When the recording medium 2 is loaded into the DVD drive device 14, the block management information 154 is copied into and is used in the nonvolatile memory 12. The initial value is set for the full mesh management information storage location so as to indicate that the full mesh management information is all stored in the recording medium 2. The number of sets of block management information 154 corresponds to the number of different levels of map data that are available.

The full mesh management information 155 is stored in units of individual blocks at each level. For instance, the map data at level 0 are divided into m blocks and thus, there are m sets of full mesh management information 155 in correspondence in the example presented in FIG. 6. The same principle applies to the map data at levels 1 through 6. Each set of full mesh management information 155 includes information indicating the storage locations of all the meshes contained in the corresponding block, information indicating the positions of all the meshes, information indicating the size of the meshes and history information related to all the meshes in the block.

The map data 156 are equivalent to data provided in units of individual meshes. The map data 156 are stored in the number of sets matching the sum of the numbers of all the meshes in all the blocks at all the levels of map data stored in the recording medium 2. The structure of the map data in each mesh is as shown in FIG. 4. Since different types of map data in each mesh are updated with varying update cycles, the management information and updated data are managed in the nonvolatile memory 12 and the data in the recording medium 2 are used as non-updated data. For instance, while the shapes, text and the like constituting the background data are updated frequently, the other type of map data, i.e., the extension data, is not updated as frequently. For this reason, the capacity of the nonvolatile memory 12 can be more efficiently utilized by storing the updated data into the nonvolatile memory. To enable individual management of the basic data and the extension data constituting the map data, the mesh internal management information includes history information indicating the histories of the individual types of data, and information indicating the storage locations, the storage positions and the sizes of the individual types of data.

—Structure of Data in the Nonvolatile Memory—

As shown in FIG. 5, the nonvolatile memory 12 holds the block management information 124, the full mesh management information 125, and map data 133. It also holds stored data information (not shown) and level management information (not shown). The data are stored in a file format. The stored data information and the level management information are stored in a main management file (not shown). The block management information 124 is stored in block management files, the full mesh management information 125 is stored in full mesh management information files and the map data 133 are stored in map data files.

—Main Management File—

In the main management file (not shown), stored data information and level management information copied from the recording medium 2 are stored. The stored data information is created by copying the stored data information in the main data file in the recording medium 2 when data (e.g., guidance search data) other than the data provided in units of meshes in the recording medium 2 are updated and the updated data are stored into the nonvolatile memory 12. Each time data other than the data provided in units of individual meshes are updated and the updated data are stored into the nonvolatile memory 12, the storage location of the corresponding management information is switched from the recording medium 2 to the nonvolatile memory 12.

In addition, medium identification information is contained in the stored data information so as to indicate the recording medium 2 which is the source of the particular piece of cache information. As long as this information and the medium identification information in the recording medium 2 match when they are compared with each other at startup, no problem arises. However, if they do not match (if a different recording medium is loaded), the storage location, the positions and the sizes which are managed with the individual sets of information in the nonvolatile memory 12 are inconsistent with those in the other recording medium 2 and thus, the updated data in the nonvolatile memory 12 can no longer be used. If this occurs, the navigation is executed by using the data in the recording medium 2 alone.

The level management information is created by copying the level management information in the recording medium 2 when any set of mesh data in the map data stored in the recording medium 2 is updated and the updated mesh data are stored into the nonvolatile memory 12. Each time map data are stored into the nonvolatile memory 12, the storage location of the block management information at the corresponding level is switched from the recording medium 2 to the nonvolatile memory 12. At this time, the information indicating the position and the size of the block management information, too, is updated so as to indicate the values in the nonvolatile memory 12.

—Block Management Files—

Block management files are created by copying the block management information 154 at the individual levels in the recording medium 2 into the nonvolatile memory 12 when the recording medium 2 is loaded into the DVD drive device 14. The initial values of the storage locations of the full mesh management information corresponding to the various blocks are invariably set to indicate the recording medium 2. When map data are updated and stored into the nonvolatile memory 12, the block management information at the level corresponding to the map data being updated, too, is updated. The storage location of the full mesh management information of the map data being updated is switched from the recording medium 2 to the nonvolatile memory 12. At this time, the information indicating the position and the size, too, is changed to indicate the values within the nonvolatile memory 12. The block management files are each created in correspondence to one of the different levels of map data. The file name assigned to a block management file is created by using the corresponding level as a key. Since this eliminates the need to write a block management file name, the level management information size does not become unnecessarily large.

—Full Mesh Management Information Files—

A full mesh management information file is created when map data in a mesh inside a given block are updated for the first time and the updated map data are stored into the nonvolatile memory 12, by copying the full mesh management information for the block corresponding to the map data in the recording medium 2. The storage location of the map data is switched from the recording medium 2 to the nonvolatile memory 12. At this time, the information indicating the position and the size of the map data, too, is updated to indicate the values within the nonvolatile memory 12. Subsequently, if mesh data within the same block are updated, the full mesh management information file for the block which is already in the nonvolatile memory 12 is updated. Full mesh management information files are created each in correspondence to one of the blocks. The file name assigned to a full mesh management information file is created by using the corresponding level and block management information as keys. Since this eliminates the need to write a full mesh management file name, the block management information size does not become unnecessarily large.

—Map Data Files—

A map data file is created when map data are updated and the updated map data are stored into the nonvolatile memory 12. Map data files are each created in correspondence to a specific mesh. Full mesh management information corresponding to the updated map data is created by copying the full mesh management information in the recording medium 2, and the storage location, the storage position and the size of the actually updated basic/extension data alone are updated to the values within the nonvolatile memory 12. Data in the recording medium 2 are referenced when non-updated basic/extension data are needed. Map data files are created each in correspondence to a specific mesh. The file name assigned to a map data file is created by using the corresponding level, block management information and full mesh management information as keys. Since this eliminates the need to write a map data file name, the map management information size and the block management information size do not become unnecessarily large.

FIG. 4 shows the structure of the data in a single mesh 103 or 105 in FIG. 3. The mesh data are constituted with the mesh internal management information 111, the background (for map display) data 112, the locator data 113, the network (for route calculation) data 114 and the guidance data 115. The mesh internal management information 111 and the background (for map display) data 112 constitute basic data, whereas the locator data 113, the network data 114 and the guidance data 115 constitute extension data. The basic data are included at all the levels of data. The mesh data at a given level contain specific extension data inherent to the level. For instance, the network data are contained in the data at levels 1, 2, 3 and 4 alone, whereas the locator data and the guidance data are provided in the data at level 0 alone. It is to be noted that address calculation data, image data, VICS data, building attribute data, peripheral area search data and the like may also be provided as extension data.

—Basic/Extension Data in the Map Data—

As shown in FIG. 4, each set of map data is constituted with basic data which include the mesh internal management information 111 and the background (for map display) data 112 and extension data which include a plurality of different types of data such as the locator data 113, the network data 114 and the guidance data 115. The following is an explanation of the various types of data (frames) constituting the map data.

—Mesh Internal Management Information—

Each set of mesh internal management information 111 includes information inherent to the map data contained in the corresponding mesh and information indicating the storage locations, the positions, the sizes and the like of the stored background and extension data. FIG. 7 shows the structure of the mesh internal management information 111. The mesh internal management information 111 is constituted with mesh information 161, background management information 162, extension data identification information 163 and extension data management information 164.

As the mesh information 161, basic information such as the size of the mesh internal management information, the actual size of the corresponding mesh taken along the vertical and horizontal directions and the like is stored. The background management information 162 contains management information related to the background data (map display data) in the mesh. More specifically, history information, information indicating the storage location, information indicating the storage position, offset information and information indicating the size are stored as the background management information. As the history information, the management number assigned to updated information, for instance, is stored, and the management number bears a larger value to indicate a more recent data version. As the storage location information, an identification flag indicating whether the data are stored in the recording medium 2 or the nonvolatile memory 12 is stored. The storage position at which the background data are stored is written as the storage position information. If the background data are stored in the recording medium 2, the storage position is indicated as the offset from the beginning of the main data file, whereas the storage position is indicated as the offset from the beginning of the corresponding map data file itself if the background data are stored in the nonvolatile memory 12. The actual size of the background data is stored as the size information.

The background data are managed by further dividing the area contained in each mesh into n×m portions. Thus, there are n×m sets of background management information in correspondence to a given mesh. The background data are updated individually in units of the partitioned mesh portions (n×m mesh portions).

As explained earlier, a given level of map data does not necessarily include all the types of extension data. In addition, even when a given type of information can be added on, it may not always be contained in all the meshes. For instance, the network data are not contained in a mesh holding data constituted entirely of a body of water. For this reason, the types of extension data that can be added onto the corresponding mesh and the presence/absence of the individual types of extension data are written as the extension data identification information 163. The sets of extension data management information 164, the number of which matches the number of different types of extension data that can be added onto the mesh data, are provided in the order specified in the information.

Each set of extension data management information 164 contains management information for the corresponding type of extension data. The various types of extension data are each managed as are the background data. History information of the extension data is managed in correspondence to a specific type of extension data.

—Background Data—

While the background data (map display data) 112 may be managed in units of individual meshes, they are managed by further dividing the area contained in each mesh into n×m portions in the embodiment, so as to allow the data to be handled at a small screen with small memory, as in a portable telephone. The background data 112 are updated in units of single divided portions (in units of single mesh portions). The standardized size of the background data is set to 256×256 (a coordinate value assumes a value between 0 and 256) per mesh portion. A given mesh may contain, for instance, 4×4 mesh portions. In this case, the standardized size of the background data corresponding to one mesh is 1021×1021, since the coordinate value 255 in a given mesh portion equals the coordinate value 0 in the adjacent mesh portion and thus, the number of coordinate points is calculated to be 1021 by subtracting 3 from 256×4.

While the standardized size is smaller than the size of other map data, this does not pose any problem in actual use since the background data contained in only up to a single mesh portion can be displayed over a range containing approximately 320×260 points. In addition, since the number of bits used in correspondence to a single coordinate point can be reduced, the size of the overall data can be reduced as well.

Various background shapes are managed over up to 256 layers and are each drawn with the drawing attribute corresponding to a specific layer. While the background data in the existing navigation data are divided into approximately 16 different classes and the different classes of background data are each assigned with specific drawing attributes, there are not enough classes to indicate various types of background objects in a map of an urban area or the like with distinguishable colors. For this reason, the number of layers that are equivalent to the classes in the related art is increased to 256. The background objects are drawn in the order in which the corresponding background data were stored. In the case of the existing navigation data, data indicating the shapes of objects in a given type are all stored continuously. Thus, the shapes of objects of the same type that need to be drawn in a different order, e.g., a road running under an elevated express highway and a road running astride an express highway) cannot be displayed correctly, or an extra class needs to be created unnecessarily. By drawing various shapes of background objects in the order matching the order with which the corresponding data were stored, it is ensured that the number of layers does not need to increase.

In some existing navigation data, a single type of road shape data is used for both display and for map matching networking, so as to reduce the data volume by using the same road shape data for the display and the search. In the embodiment, the storage of road shape data used as the background data is switched for each level of data. An advantage of storing road shape data as background data lies in that when drawing a map, the map can be drawn through a single access without having to perform a plurality of accesses to acquire different types of data such as background data, road data and text data. In addition, since the road shapes only need to be indicated as background, their shapes and connections can be drastically simplified or exaggerated to make it possible to reduce the volume of the display data and improve the display speed.

—Locator Data—

The locator data express roads with links, nodes and link strings. A node may be an intersecting point or a special point specified on a road. A link is equivalent to a road connecting nodes, whereas a link string is a string of a plurality of links representing a single road. The locator road data, which are provided in the road map data at the lowermost level 0, are used when verifying the position of the subject vehicle, obtaining the route coordinates resulting from a route search, conducting a narrow urban street search and the like. The road data used as locator data hold information similar to the types of information held in the navigation data in the related art. Namely, roads sharing a common attribute are managed as a collection of road data which are managed in the form of link strings. The road attributes are divided into two primary groups, i.e., road attributes assigned to individual link strings and road attributes assigned to individual links or individual nodes.

The attributes assigned to individual link strings include road types, toll/toll-free designation, infrastructure object attributes and route calculation target flags and the like. The attributes assigned to links or nodes include link types, widths, intersecting link information, regulation information and interpolation point coordinate information. The number of standardized coordinate points in the locator data is 2048× 2048. The standardized size of the locator data differs from that of the background data (1021×1021) since the locator data need to assure a higher degree of coordinate accuracy.

An explanation is now given on how the connections with the roads in an adjacent mesh are achieved when the locator data in a given mesh have been updated.

Link string data corresponding to a given link string in the locator data are constituted of a string of sets of data related to nodes present in the link string. The data related to each node include data indicating the positional coordinates of the node, the link number assigned to a link connecting with the node and the like. The standardized coordinate values are used to indicate the positional coordinates of the node.

FIG. 8 shows a road that extends over two adjacent meshes. A mesh 171 and a mesh 172 lie adjacent to each other, and a single road represented by a link 173 and a link 175 extend through the meshes 171 and 172. A connecting point set on the road at each mesh boundary constitutes a node. At the mesh 171, a node 174 is set as the connecting point node, whereas a node 176 is set as the connecting point node at the mesh 172.

The data related to each node contains the positional coordinates of the node and the link number assigned to the link connecting with the node along one direction. For instance, the positional coordinates of the node 174 and the link number of the link 175 connecting with the node 174 to the right are stored for the node 174. The positional coordinates of the node 176 and the link number of the link 173 connecting with the node 176 to the left are stored for the node 176.

If the mesh 171 and the mesh 172 contain data sharing the same history, the points at which they should be connected with each other can be specified by checking the link numbers assigned to the connecting links. However, the link number assigned to the link 175 may change due to an update of the data in the mesh 172. In such a case, the connecting points at the mesh boundary can no longer be identified with the link numbers.

In the embodiment, the connecting points are identified by conducting a search to ascertain whether or not a connecting point with the same positional coordinates is present at the adjacent mesh if data have been updated. Namely, meshes are connected by using standardized coordinate values of the connecting points. An adjacent mesh itself is identified by using the mesh position information or the like as in the related art.

It is to be noted that if the data in a mesh are updated without updating the data in an adjacent mesh following the construction of a new road, a road to connect to the new road may not be found in the data in the non-updated mesh. In such a case, the road is processed as a dead end in the data even when the road actually continues on into the non-updated mesh. Under these circumstances, it is more desirable to update the locator data for the adjacent mesh as well. Accordingly, an update request that the map data in the adjacent mesh be updated may be automatically transmitted if the map server 6 can be accessed via the Internet. Alternatively, a display or the like may be brought up so as to prompt the user to transmit a map data update request.

—Network (route calculation) Data—

The lowest level of data that contain the network data as extension data is level 1 (scaling factor 1/25,000), and is used for reference. The network data are also stored as extension data of data at a plurality of higher levels. As are the locator data, the network data, too, are prepared based upon the concept of links, nodes and link strings. The network data contain connection information indicating how nodes representing intersecting points connect with other nodes. Each node holds subject node information and adjacent node information on each adjacent node with which the subject node connects. As the subject node information, the positional coordinates of the subject node are stored, whereas information related to all the nodes that connect with the subject node is stored as the adjacent node information. As the node information of a connecting node, the node number assigned to the node and the link number assigned to a link connecting to the node are stored.

The range within which a single set of network data are contained as the same as the range containing the corresponding map data, and the standardized size of each mesh is 2048×2048.

The structure of the network data which greatly differs from that of the existing navigation data is the correlation of nodes and links in adjacent meshes and also among different levels. In the case of the existing navigation data, a node in a given mesh or at a given level is made to correlate to the same node in an adjacent mesh or at a different level by directly referencing the index number or the offset information. In contrast, data are updated in units of individual meshes and new and old data are utilized in combination in the embodiment. For this reason, the node/link correlation cannot be directly referenced by checking the index numbers or the offset information, unlike in the related art.

As long as history information for the network data in a mesh matches history information for the network data in an adjacent mesh or as long as history information for the network data in a higher-order mesh matches history information for the network data in a lower-order mesh, the node/link correlation can be referenced by using the index number or the like as in the related art. However, if the sets of history information do not match, the correlation cannot be referenced by using index numbers or the like. Accordingly, the coordinate values of the connecting points at the mesh boundaries are used as keys in the embodiment, as is done with the locator data. As a connecting point used to correlate different levels to each other, a node present both in a higher-order level mesh and in a lower-order level mesh, which is not necessarily on the mesh boundary, is selected.

When searching for a matching node in an adjacent mesh simply by using the coordinate values as a key, the set of coordinate values and the node will achieve a one-to-one match at the lowest-order (most detailed) level unless there are roads intersecting each other on the mesh boundary, since node coordinates are defined at the resolution of the standardized coordinates at the lowermost order level. For this reason, the matching node can always be searched even though it takes a considerable length of search time. However, the matching node cannot be accurately searched in higher-order level network data simply by using coordinate values as a key, since there is a possibility that a plurality of different nodes may exist at the same coordinates. Namely, when two nodes present in close proximity to each other, they are defined with different coordinate values at a lower-order level. However, the coordinate values may be rounded and, as a result, the two nodes may be indicated with the same coordinate values at a higher-order level. In such a case, the two nodes cannot be distinguished from each other and thus, an accurate search cannot be conducted.

For this reason, the coordinate values at the lowermost layer level, too, are used as a key, as well as the coordinate keys in the embodiment. As a result, even when there are a plurality of nodes with the same coordinate values at a higher level, the coordinate keys of the same nodes, which are used as sub keys, at the lowermost level are different and the matching node can be searched with accuracy. In addition, since there may be a plurality of nodes with the same coordinate values even at the lowermost level, a 4-bit extension coordinate value (within a range of 0 through 15) is attached to the coordinate values of each node at the lowermost layer.

With (Xh, Yh) representing the standardized coordinates of a node at a higher-order level, (X1, Y1) representing the standardized coordinates of the node at the lower-order level and a representing the extension coordinate value, the standardized coordinates of the node at a given higher-order level can be defined by the combination of (Xh, Yh), (X1, Y1) and (a).

Through the measures described above, data at different levels can be connected with a high degree of reliability as well as data in adjacent meshes, even when newer versions of data are used together with the original version of data. It is to be noted that corresponding meshes at different levels are identified by using level correspondence tables provided each in correspondence to a given level of data. In a level correspondence table, information that indicates a specific node at a lower-order level that corresponds to a node at the subject level also indicates the mesh containing the corresponding node. Thus, by using the level correspondence table and the definition of the standardized coordinates explained above, connecting points at different levels can be accurately matched. Even when the data in a given mesh at a lower-order level alone have been updated, the use of the level correspondence tables and the standardized coordinates allow any road that remains unchanged after the update to maintain the connection with the non-updated higher-order level data. In addition, while a newly added road or a road having undergone a change in shape in an updated mesh cannot connect with the non-updated higher-order level data, an erroneous connection of such a road, at least, can be averted.

The position of a mesh is normally indicated by the latitude and the longitude of the lower left corner of the mesh. Namely, each set of position information 129 in the full mesh management information holds position information corresponding to the latitude and longitude of the lower left corner of the subject mesh. In addition, the standardized coordinates in the mesh are indicated by setting the lower left corner of the mesh as the origin point. Accordingly, the standardized coordinates explained earlier indicate various positions in the map as two-dimensional coordinate values corresponding to specific latitudinal and longitudinal values based upon the mesh position information indicating the mesh position by its latitude and longitude. Such two-dimensional coordinate values, which correspond to latitudinal and longitudinal values, may be considered to be universal values that remain unaffected by differences among various navigation systems and standards. In other words, adjacent meshes and meshes at higher and lower levels are connected by using universal keys.

It is to be noted that the standardized coordinates of the node at a higher-order level may be instead defined so as to be indicated with the combination of (Xh, Yh) and (X1, Y1) or the combination of (Xh, Yh) and (a).

In addition, the standardized node coordinates (X1, Y1) at the lower-order level do not need to be the coordinates at the lowermost level. The coordinates at any appropriate lower level may be used as such. The extension coordinate a is a parameter other than the standardized coordinates and may be, for instance, height data indicating the height of the node. Alternatively, it may be time data (information) related to the data generation/update. Moreover, the extension coordinate a may be set by combining the height data and the time data. The data size of a may be greater than four bits, as well.

The standardized coordinates described above are defined by using a parameter such as the coordinates (X1, Y1) at another level or the height data (a), in addition to the two-dimensional coordinates (Xh, Yh) at the subject level. Since this parameter is used to attach PS information to the two-dimensional coordinates so as to indicate the connecting state between different levels in the embodiment, it is referred to as a level correspondence key in the description of the embodiment. It may be otherwise referred to as a 2.5 dimensional space key.

In the embodiment, the correspondence between nodes at different levels is indicated in the level correspondence tables each provided in correspondence to a given level. For this reason, the level correspondence keys of the various levels do not need to hold the standardized coordinates at all the lower levels. For instance, they may hold the standardized coordinates at the lowermost level alone. When the standardized node coordinates at level 0 are (X0, Y0), the standardized node coordinates at level 1 are (X1, Y1), the standardized node coordinates at level 2 are (X2, Y2) and the standardized node coordinates at level 3 are (X3, Y3), the level correspondence keys for the node at the individual levels are defined as follows. The level correspondence key at level 0 is defined as (X0, Y0), the level correspondence key at level 1 is defined by the combination of (X1, Y1) and (X0, Y0), the level correspondence key at level 2 is defined by the combination of (X2, Y2) and (X0, Y0) and the level correspondence key at level 3 is defined by the combination of (X3, Y3) and (X0, Y0).

—Guidance Data—

The guidance data that are included in the map data at the lowermost layer level 0 only are used when providing route guidance along the route resulting from a route search. As the guidance data, information indicating intersecting point names, information indicating road names, information indicating directional terms, directional guidance information, spot guidance information, information on landmarks in surrounding areas, information on road construction and the like is stored.

—Data Update with the Removable Memory—

Figure 9:
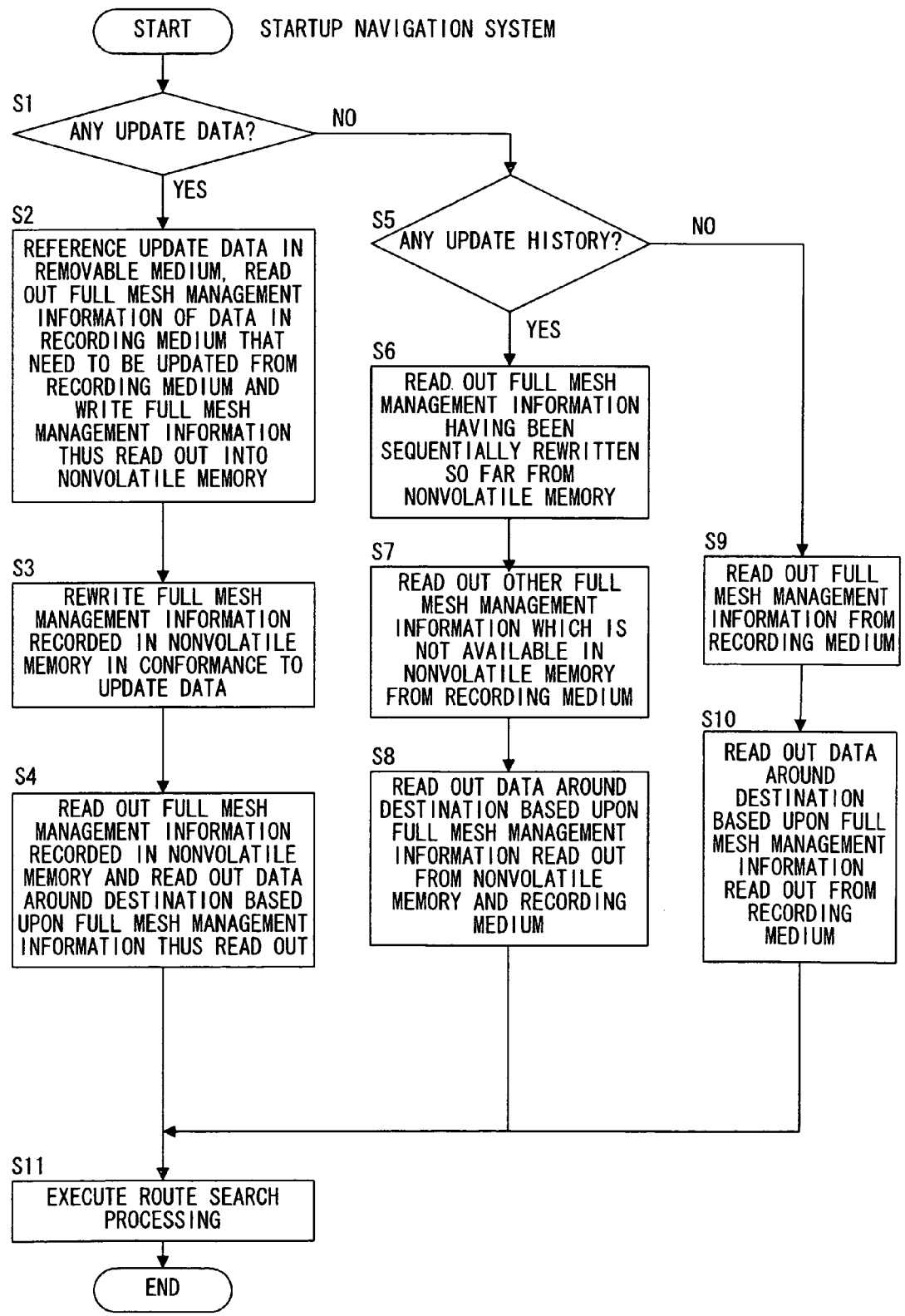
FIG. 9 presents a flowchart of the processing through which map data are updated by using a removable memory, data of an area around the destination are read and a route search is executed.

FIG. 9 presents a flowchart of the processing through which map data are updated with the removable memory 3, data of an area around the destination are read out and a route search is executed. The update data are provided in the removable memory 3. Control, the flow of which is shown in the flowchart in FIG. 9, is executed by the control device 11.

As the power to the navigation system 1 is turned on, the program that executes the processing as shown in the flowchart presented in FIG. 9 is started up. In step S1, a decision is made as to whether or not there are any update data. The decision as to whether or not there are any update data is made by judging whether or not a removable memory 3 having stored therein update data is currently loaded. If it is decided that there are update data, the operation proceeds to step S2.

In step S2, the update data in the removable medium 3 are referenced, the full mesh management information corresponding to the data in the recording medium 2 that need to be updated is read out from the recording medium 2 and the full mesh management information thus read out is written into the nonvolatile memory 12. In step S3, the full mesh management information recorded in the nonvolatile memory 12 is rewritten in conformance to the update data. In step S4, data of an area around the destination are read out based upon the full mesh management information recorded in the nonvolatile memory 12. In the previous explanation, the update data are written in the nonvolatile memory 12. However, in this example, the update data are simply read from the removable memory 3 by directly loading the removable memory 3. Non-updated map data are read from the recording medium 2.

If, on the other hand, it is decided in step S1 that there are no update data, the operation proceeds to step S5. In step S5, a decision is made as to whether or not there is a history of an update. The decision as to whether or not there is an update history is made by accessing the block management information 124 in the nonvolatile memory 12. If it is decided in step S5 that there is an update history, the operation proceeds to step S6. In step S6, the full mesh management information that has been sequentially rewritten to the current version is read out from the nonvolatile memory 12 by referencing the block management information 124. In step S7, the full mesh management information that is not stored in the nonvolatile memory 12 is read out from the recording medium 2 by referencing the block management information 124. In step S8, data of an area around the destination are read out as in step S4, based upon the full mesh management information read out from the nonvolatile memory 12 and the recording medium 2.

If it is decided in step S5 that there is no update history, the operation proceeds to step S9. In step S9, the full mesh management information is read out from the recording medium 2. Next, in step S10, data of an area around the destination are read out from the recording medium 2 based upon the full mesh management information read out from the recording medium 2.

In step S11, a route search is executed by using the map data that have been read. While only the data of an area around the destination are read in the flowchart presented in FIG. 9, the route search is executed by sequentially reading data around the current position as well.

—Data Update Through Communication With the Map Server—

Figure 10:
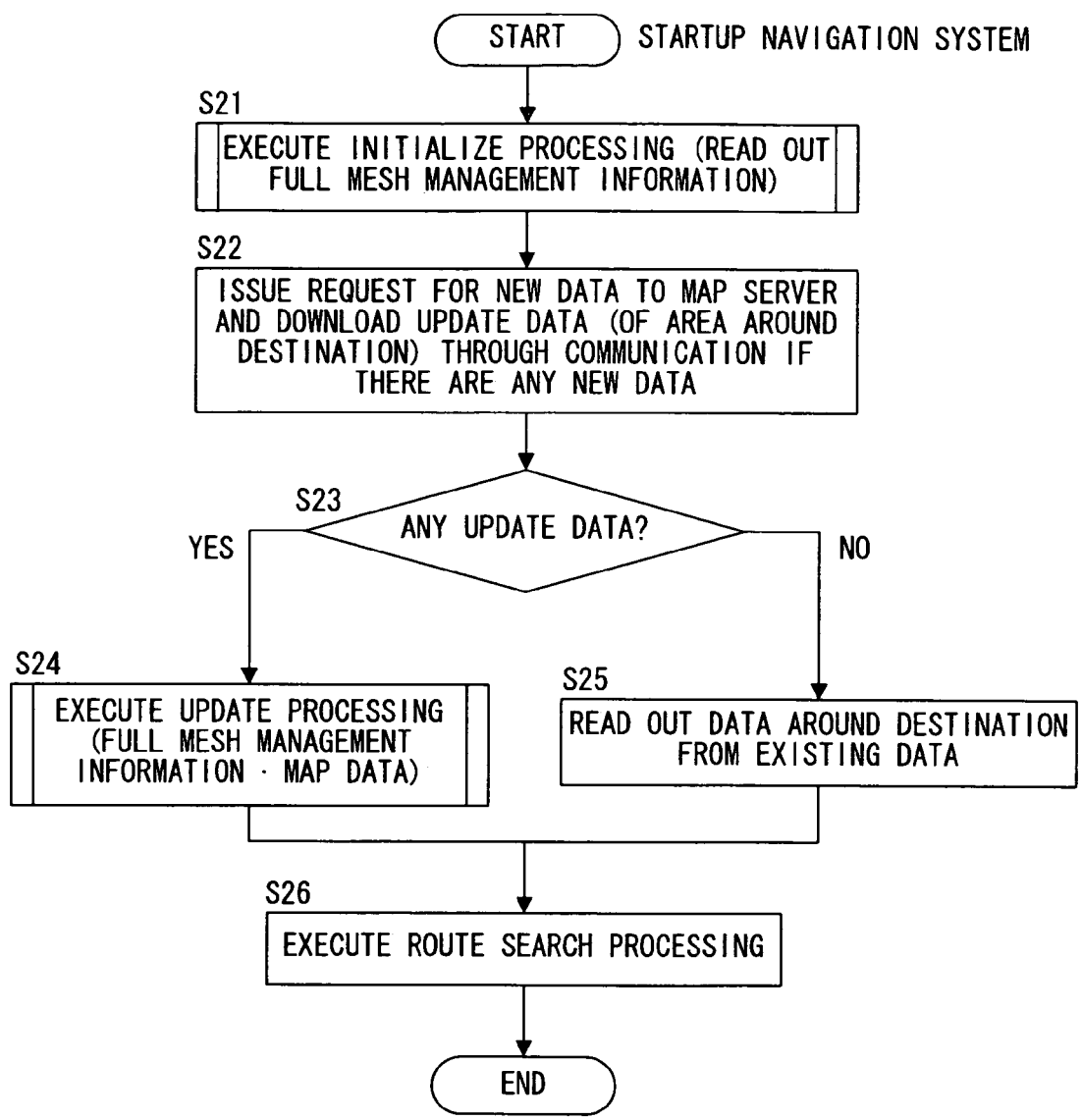
FIG. 10 presents a flowchart of the processing through which data of an area around the destination read from the map server via the Internet are used for an update, data of an area around the current position and an area around the destination are read and a route search is executed.

FIG. 10 presents a flowchart of the processing through which data of an area around the destination read from the map server 6 via the Internet 5 are used for an update of data for an area around the current position and the data of the area around the destination are read out, and a route search is executed. The update data are provided from the removable memory 3 and the map server 6. Control, the flow of which is shown in the flowchart presented in FIG. 10, is executed by the control device 11.

Figure 11:
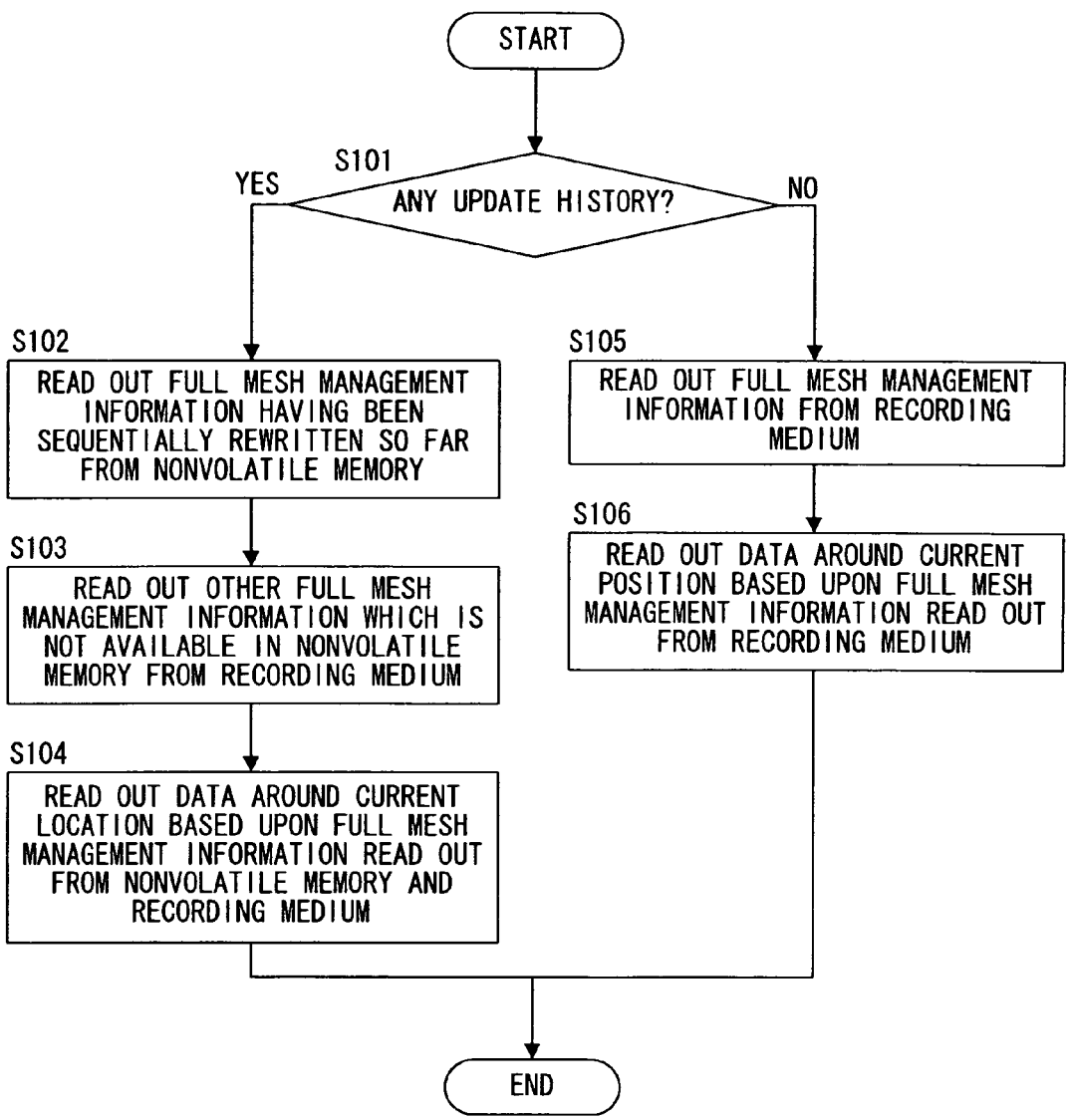
FIG. 11 presents a flowchart of the initialize processing executed in step S21 in FIG. 10.

As the power to the navigation system 1 is turned on, the program that executes the processing as shown in the flowchart presented in FIG. 10 is started up. In step S21, initialize processing including a read of the full mesh management information is executed. FIG. 11 presents a flowchart of the initialize processing.

In step S101 in FIG. 11, a decision is made as to whether or not there is a history of an update. The decision as to whether or not there is an update history is made by accessing the block management information 124 in the nonvolatile memory 12. If it is decided in step S101 that there is an update history, the operation proceeds to step S102. In step S102, the full mesh management information that has been sequentially rewritten to the current version is read out from the nonvolatile memory 12 by referencing the block management information 124. In step S103, the full mesh management information that is not stored in the nonvolatile memory 12 is read out from the recording medium 2 by referencing the block management information 124. In step S104, data of an area around the current position are read out based upon the full mesh management information read out from the nonvolatile memory 12 and the recording medium 2. Next, the operation proceeds to step S22 in FIG. 10.

If, on the other hand, it is decided in step S101 that there is no update history, the operation proceeds to step S105. In step S105, the full mesh management information is read out from the recording medium 2. Next, in step S106, data of an area around the current position are read out from the recording medium 2 based upon the full mesh management information read out from the recording medium 2. Next, the operation proceeds to step S22 in FIG. 10.

The data of the area around the destination are read in step S22 and subsequent steps in FIG. 10. In step S22, a request for new data is issued to the map server 6, and if there are any new data, the update data (of the area around the destination) are downloaded through communication. In step S23, a decision is made as to whether or not there are any update data. The decision as to whether or not there are any update data is made by judging whether or not any update data have been transmitted from the map server 6. If it is decided that there are update data, the operation proceeds to step S24 to execute update processing.

Figure 12:
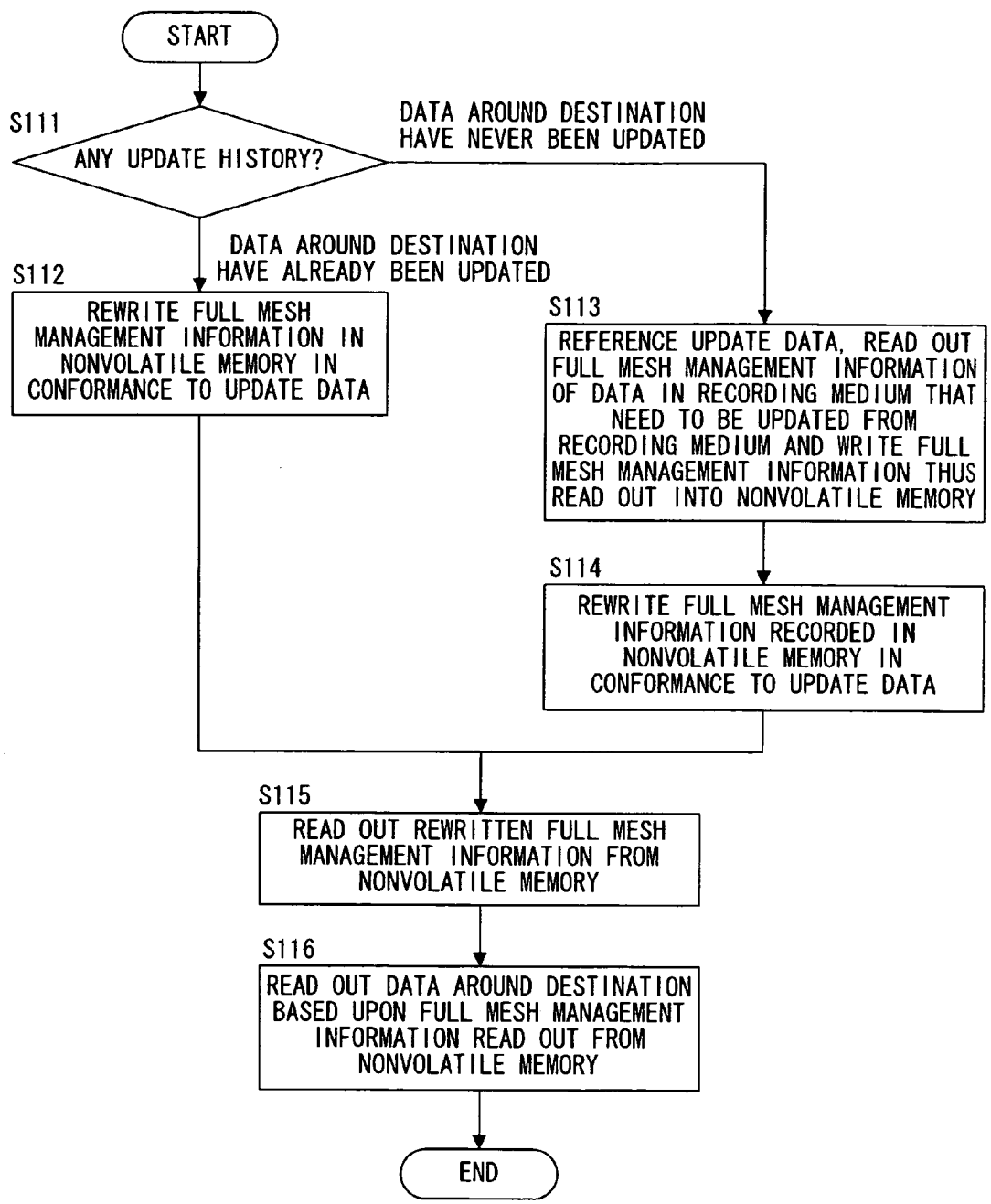
FIG. 12 presents a flowchart of the update processing executed in step S24 in FIG. 10.

FIG. 12 presents a flowchart of the update processing. In step S1 in FIG. 12, a decision is made as to whether or not there is an update history with regard to the data of the area around the destination, i.e., whether or not the data of the area around the destination have ever been updated. If it is decided that the data have been updated, the operation proceeds to step S112. In step S112, the full mesh management information already stored in the nonvolatile memory 12 is rewritten in conformance to the update data having been transmitted from the map server 6. Then, the operation proceeds to step S115.

If, on the other hand, it is decided in step S111 that the data of the area around the destination have never been updated, the operation proceeds to step S113. In step S113, the update data having been transmitted from the map server 6 are referenced, the full mesh management information corresponding to the data in the recording medium 2 that need to be updated is read out from the recording medium 2 and the full mesh management information thus read out is written into the nonvolatile memory 12. In step S114, the full mesh management information recorded in the nonvolatile memory 12 is rewritten in conformance to the update data. Subsequently, the operation proceeds to step S115.

In step S115, the full mesh management information that has been rewritten is read from the nonvolatile memory 12 into the memory 126. In step S116, the data of the area around the destination are read out based upon the full mesh management information read out from the nonvolatile memory 12. Then, the operation proceeds to step S26 in FIG. 10.

If it is decided in step S23 in FIG. 10 that no update data have been transmitted from the map server 6, the operation proceeds to step S25. In step S25, the data of the area around the destination contained in the existing data are read out. Namely, the data are read out either from the recording medium 2 or the nonvolatile memory 12 if the data have been previously updated. In step S26, a route search is executed based upon the map data having been read.

—Data Update in the Menu Screen—

Figure 13:
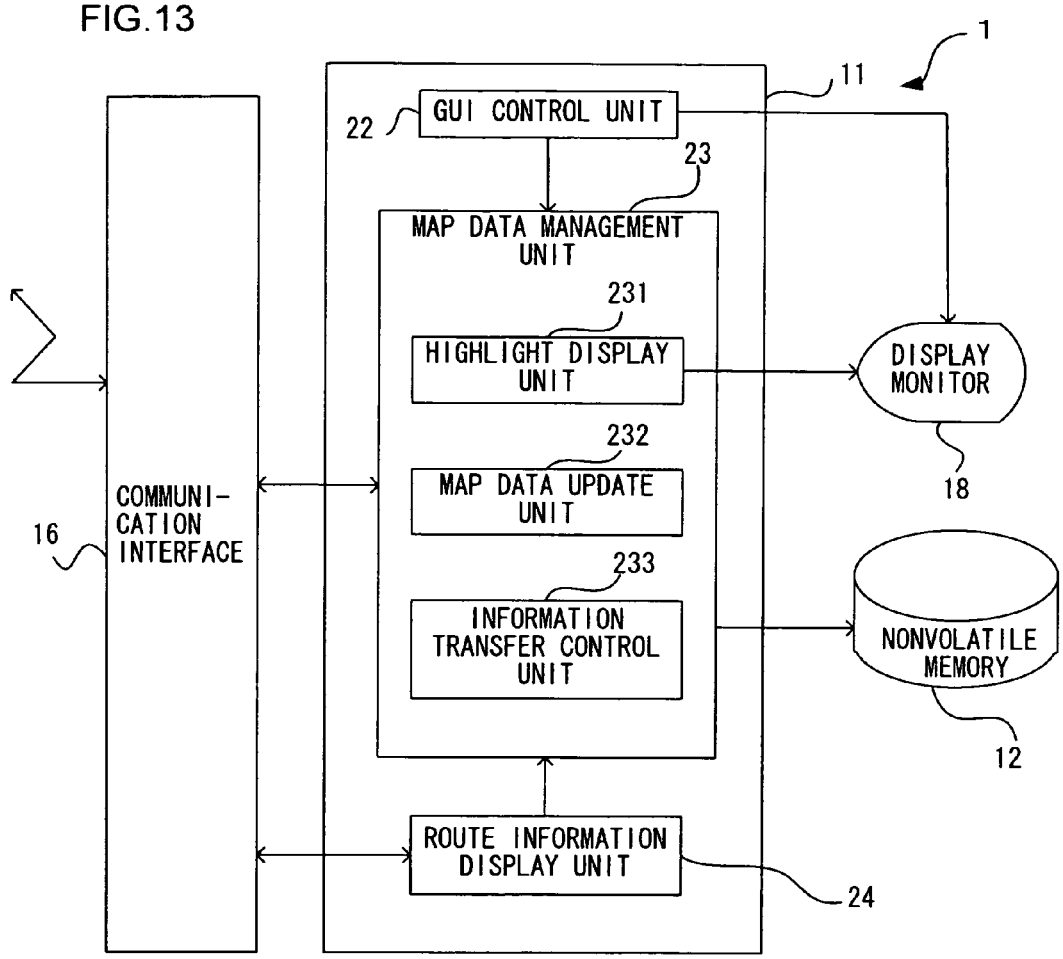
FIG. 13 is a block diagram of the internal structure adopted in the navigation system, indicating specific functions achieved therein.

Next, an explanation is given on how map data are updated in a menu screen by communicating with the map server. FIG. 13 is a block diagram indicating specific functions achieved in the control device 11 of the navigation system 1. The function of a given block is achieved in the control device 11 by executing the corresponding program read out from a ROM (not shown) having the program recorded therein. The control device 11 is constituted with a GUI (graphical user interface) control unit 22, a map data management unit 23 and a route information display unit 24.

The GUI control unit 22 has a function of prompting the user to select a specific option in a map data update menu prepared in advance, taking in the selection entered by the user and displaying the specific area containing the data to be updated.

The map data management unit 23 has a function of prompting the user to enter at least one selection made in an update category menu prepared in advance and ensuring that the map data update is reflected in the specific area based upon the entered selection. The map data management unit 23 also has a function of prompting the user to enter at least one selection made in an update category menu prepared in advance after route information resulting from a route search has been determined and ensuring that the map data update is reflected in the route information displayed on the map based upon the entered selection.

It is to be noted that the term "update category menu" in this context refers to a menu of various elements constituting map data. The update category menu lists options such as background data, road data, network data, guidance data and guide search data, and any single menu item can be selected by itself or a plurality of menu items may be selected in combination.

The map data management unit 23 is constituted with an emphasis (highlight) display unit 231, a map data update unit 232 and an information transfer control unit 233.

The highlight display unit 231 has a function of displaying the area to which the updated map data belong in a manner distinguishable from other areas in the area map displayed by the GUI control unit 22 based upon the selection made in the update category menu, whereas the map data update unit 232 has a function of displaying the update status of the updated map data, prompting the user to indicate his intent with regard to whether or not the map data are to be updated and ensuring that the indicated intent is reflected in the map data update.

In addition, the information transfer control unit 233 has a function of obtaining route information and update history information by issuing a request for a route search to the map server constituting the map data management apparatus, taking in map data containing the latest route information from the map server 6 by comparing the update history information with map data update history information held at the information transfer control unit itself and ensuring that the latest route information thus taken in is reflected in the route information.

The route information display unit 24 has a function of executing a route search and displaying route information of the route extending from the current position or the start point to the destination on a map.

Figure 14:
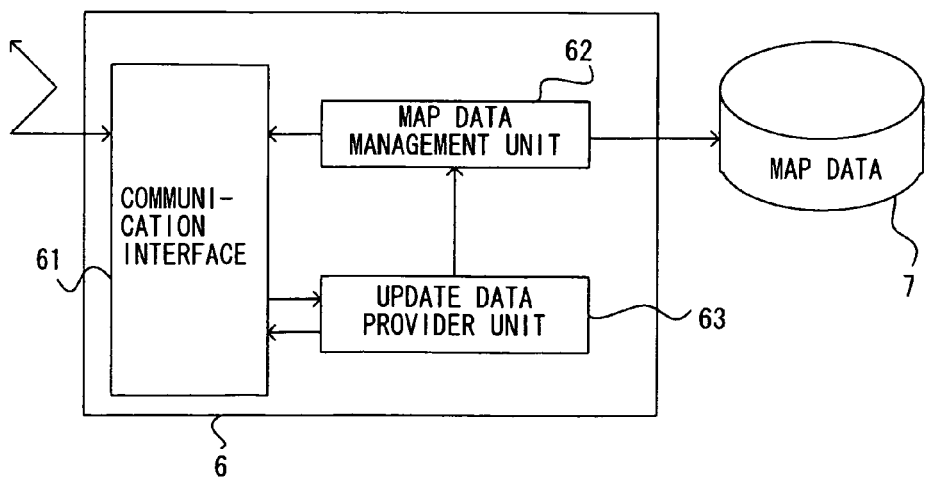
FIG. 14 is a block diagram of the internal structure adopted in the map server, indicating specific functions achieved therein.

FIG. 14 is a block diagram of the map data management apparatus achieved in the embodiment, and more specifically, it shows the internal structure adopted in the map server 6 in FIG. 1, indicating the specific functions achieved therein. The function of a given block is realized as the CPU (not shown) in the map server 6 executes the corresponding program read out from the memory (not shown) having the program recorded therein. The map server 6 comprises a communication interface unit 61, a map data management unit 62 and an update data provider unit 63.

The map data management unit 62 has a function of managing map data in unit of individual meshes, whereas the update data provider unit 63 has a function of conducting a search of an area to which relevant map data belong in units of individual meshes in response to a data update request issued from the navigation system 1 and providing the update data together with the corresponding history information.

Figure 15:
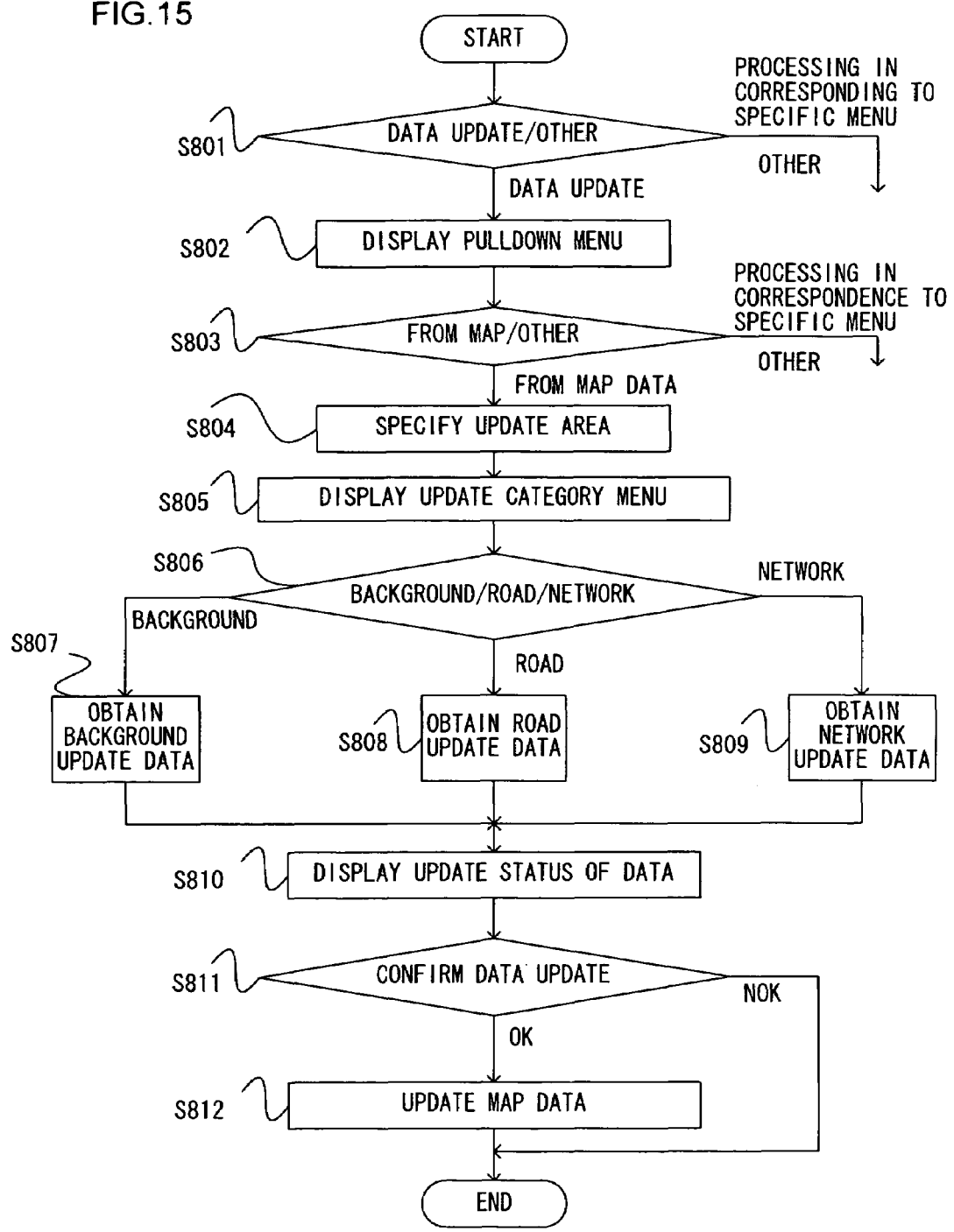
FIG. 15 presents a flowchart of operations executed in the embodiment.
Figure 16:
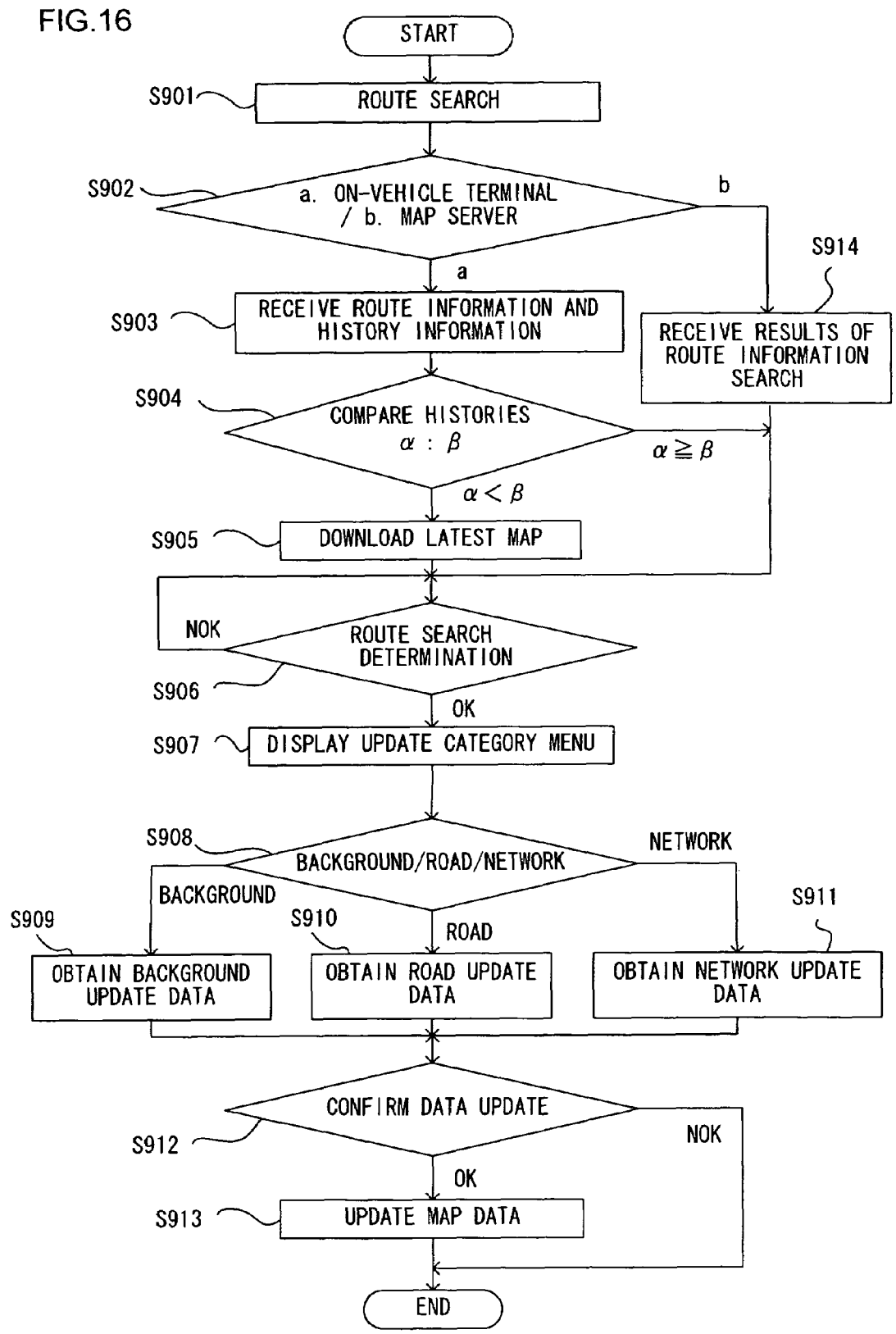
FIG. 16 presents a flowchart of operations executed in the embodiment.
Figure 17:
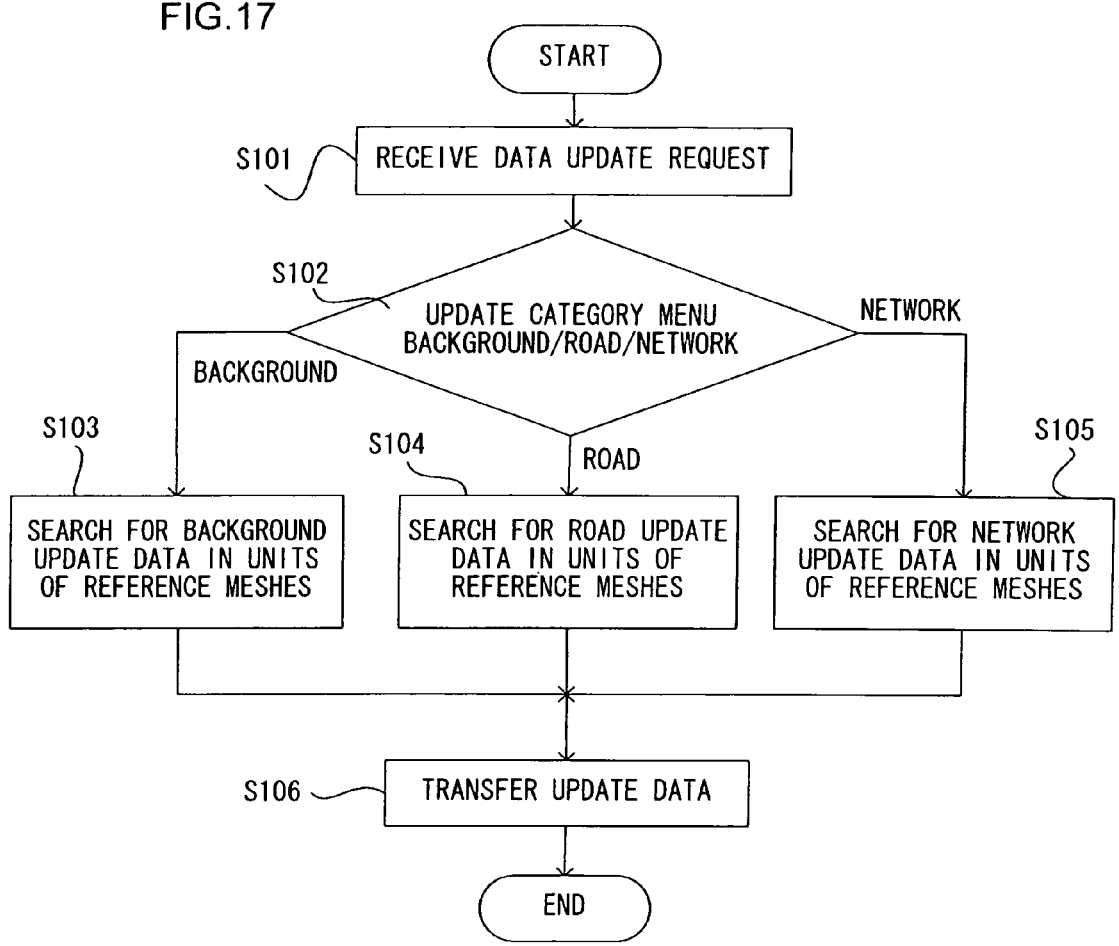
FIG. 17 presents a flowchart of operations executed in the embodiment.

FIGS. 15 and 16 present flowcharts of the operation executed at the navigation system 1. FIG. 17 presents a flowchart of the operation executed at the map server 6.

FIGS. 18 through 24 each show how the screen display shifts while the operation is in progress at the navigation system 1. The following is an explanation on how data may be updated in a menu screen, given in reference to FIGS. 18 through 24. It is to be noted that the data may be updated based upon new information in the embodiment as explained below either by replacing the data stored in the navigation system 1 with the new information or by holding the new data in addition to the existing information and by using the new information in the navigation system when it executes the processing operation as described earlier. In the latter case, the primary object, i.e., a data update, can be achieved in the navigation system even in conjunction with a storage medium that does not allow an overwrite of the initial data. There is an added advantage in that even if desirable results are not achieved from the update, the original data are still available for use.

FIG. 18 provides a summary of how the screen display at the navigation system shifts in the embodiment. FIG. 18(a) shows a screen of map display at the display monitor 18. As the user presses the menu switch at the input device 19 while this screen is up on display, the screen in FIG. 18(b) is brought up on display and a "data update" menu is selected in default. As the "data update" menu, update method options are displayed at the display monitor 18. In FIG. 18(b), the update method options are indicated in a pulldown format in the menu. If "from map" is selected and clicked in the pulldown menu (FIG. 18(c)), the operation shifts into the processing shown in FIG. 19 (to select data to undergo an update from the map on display).

Figure 20:
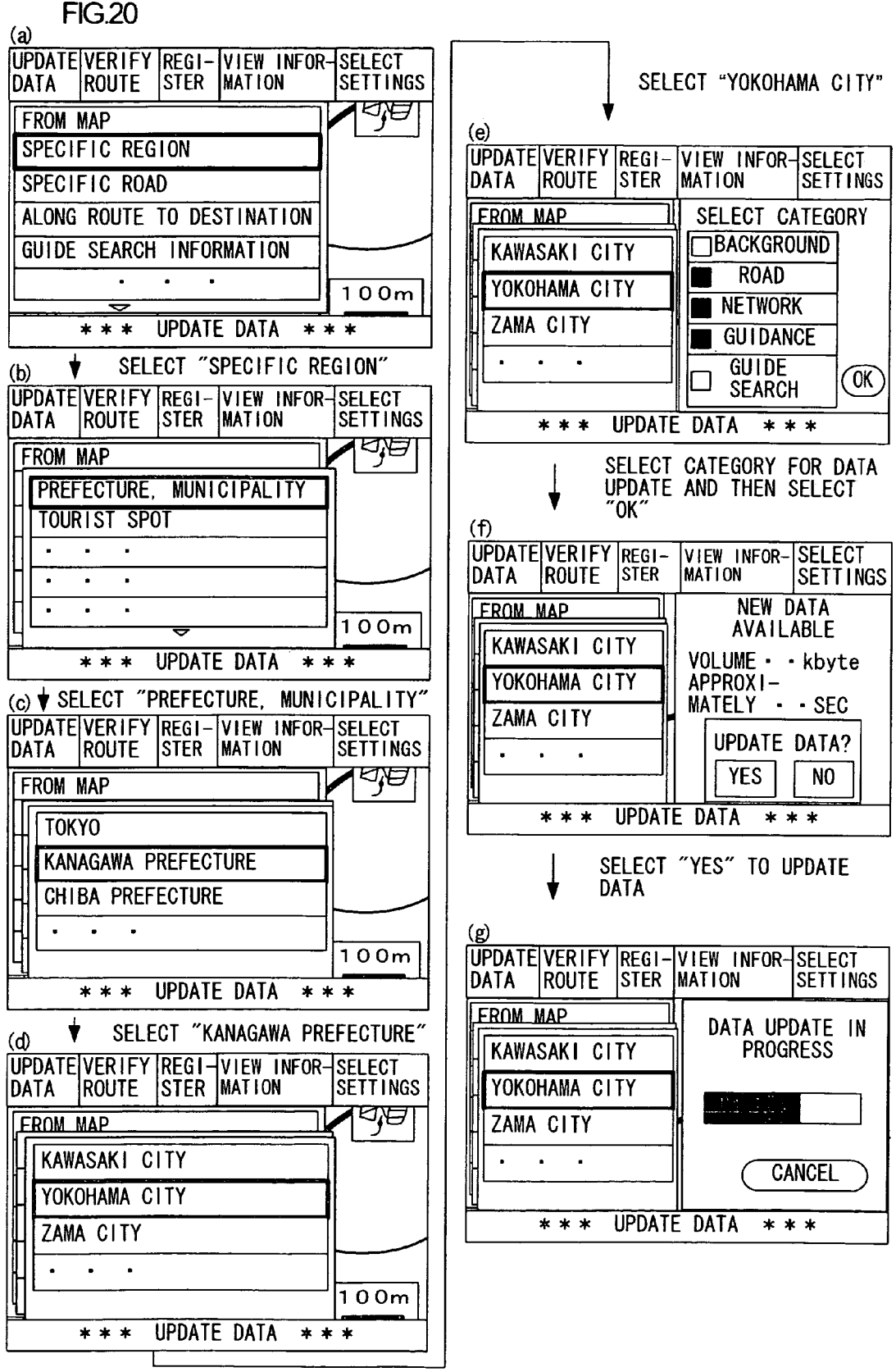
FIG. 20 is a screen transition diagram indicating how the screen display shifts during operation in the embodiment (when selecting data to be updated in correspondence to a specific region)

If, on the other hand, "specific region" is selected and clicked (FIG. 18(d)), the operation proceeds to the processing shown in FIG. 20 (to select data to undergo an update in a specific region). If "specific road" is selected and clicked (FIG. 18(e)), the operation proceeds to the processing shown in FIG. 21 (to select data to undergo an update along a specific road). If "along route to destination" is selected and clicked (FIG. 18(f)), the operation shifts into the processing shown in FIG. 22 (to select data to undergo an update along the searched route). If "guide search information" is selected and clicked (FIG. 18(g)), the operation shifts into the processing shown in FIG. 23 (to select data to undergo an update from guide search information) and if "specific category" is selected and clicked (FIG. 18(h)), the operation shifts into the processing shown in FIG. 24 (to select data to undergo an update in a specific category). Since specific update methods are indicated in response to a map data update instruction, even a user who is not familiar with the technical details can perform the task easily. In addition, since several update options are available, the data can be updated in a manner suitable under the specific set of circumstances to afford a high degree of ease of use.

FIG. 19 shows how the screen display shifts when the data to be updated are selected from the map on display, and FIG. 15 provides a flowchart of the corresponding processing procedure executed in conformance to the map management program installed in the navigation system 1 for this purpose.

The explanation is given by assuming that "data update" is selected in the menu bar at the top of the screen on the display monitor 18 and "from map" is selected in the pulldown menu appearing on the screen after selecting "data update", as shown in FIG. 19(a) (steps S801 through S803). In response, the display shifts to the screen shown in FIG. 19(b), and a map of an area containing the data to be updated is displayed by repeatedly adjusting the scaling factor of the map currently on display, the map of the entire nation of Japan or the like, or by repeatedly scrolling the map (S804).

As described earlier, the GUI control unit 22 prompts the user to select a specific map data update method in the menu offering a plurality of map data update method options, which is prepared in advance, takes in the user input indicating the selection and displays the specific area for the update at the display monitor 18.

If the update area is specified by the user by selecting "from current map", the display shifts to the screen shown in FIG. 19(c). In this screen, a menu in which a specific item in the map to be updated, e.g., a specific update category indicated on the right side of the screen is selected is displayed in, for instance, a pulldown format (S805). Five update categories including background data, road data, network data, guidance data and guide search data, for instance, may be made available to the user to make a selection from (S806). As the user selects a single or a plurality of categories of data to be updated and clicks the OK button, the display shifts to the screen shown in FIG. 19(d).

Subsequently, the map data management unit 13 takes over control. Upon taking over control, the map data management unit 13 obtains background update data if "background" has been selected (S807), obtains road update data if "road" has been selected (S808) and obtains network update data if "network" has been selected (S809).

In addition, though not shown in the figure, if "guidance" has been selected, it obtains guidance update data, whereas if "guide search" has been selected, it obtains guide search update data. It is to be noted that while such update data may be obtained either from the navigation system itself or from the map data management apparatus, the explanation is given in reference to this embodiment by assuming that the latest versions of map data are obtained by having them transferred from the map server 6 constituting the map data management apparatus.

In response to the selection of the specific update category, the display shifts to the screen shown in FIG. 19(d) to display a map indicating the data update status resulting from the search conducted by the map server 6 in units of the individual meshes (S810).

In this example, based upon the initial map on display and the update category having been selected, the area over which new data are available is visually differentiated by the highlight display unit 131, e.g., in a different color, a flashing display or the like. In addition, grid lines indicating individual meshes are also displayed. The volume of the data to be used for the update, the length of data transfer time and the like are also indicated to provide the user with useful information during the verification (S811: as to whether or not the data are to be updated). The screen also includes display of operation buttons to be used by the user to indicate whether or not the map is to be updated.

If the user issues an instruction for a map update, i.e., if he presses the operation button "yes", the display shifts to the screen shown in FIG. 19(e) to indicate the progress of the data update in real-time with an elevator icon while the map data update unit 132 actually updates the map data (S812). The full mesh management information and the like are rewritten as the data or updated, as explained earlier.

In the screen in FIG. 19(d), the area over which the map data have been revised (the area for which update data are available) is displayed in units of the individual meshes. In this embodiment, data in six of the meshes on display can be updated. The user may be allowed to choose whether the data in all six meshes are to be updated or data in a selected mesh among the six meshes only are to be updated. For instance, if it takes a considerable length of time to update all the data, the user may select a particularly crucial mesh among the six meshes containing the data which can be updated and have the data in the selected mesh alone updated. When a specific mesh is selected, the selected mesh assumes a display mode that visually differentiates the mesh from the rest, and the contents of the display with regard to the data volume and the required length of update time, too, change. Once the user selects a specific mesh for the update and presses the operation button "yes" to issue an update instruction, the data in the selected mesh are updated.

Moreover, although not included in the description of the embodiment, if the map is scrolled or another map page is selected, different map meshes are brought up on display and more meshes with data that can be updated are indicated. Accordingly, the user may be allowed to select whether the update is to be executed in the meshes with the data that can be updated are in the selected mesh currently on display, or the update is to be executed also on the data in meshes not included in the current display by scrolling or selecting a new page.

FIG. 20 shows how the screen display shifts after "specific region" is selected in the pulldown menu, and in this case, a region-based selection of the map data for an update is enabled to select the data corresponding to a specific municipality or tourist spot for the update. As the user selects "specific region" among the operating options in the operation menu displayed on the left side in FIG. 20(a), region-based operating options such as "prefecture, city", "tourist spot" and the like are output. In the example presented in FIG. 20(b), options such as "prefecture, city" and "tourist spot" are brought up on display.

If the user selects the "prefecture, city" option, the prefecture names constituting the lower-layer data of this option are output as shown in FIG. 20(c). While the prefecture names may be sequentially output starting with the northernmost or southernmost prefecture, they may instead be output starting with the names of the prefecture in which the vehicle is currently located and nearby prefectures, or starting with the names of the prefecture in which the destination is located and nearby prefectures, to enable speedier selection of the data for the update in most cases.

If, for instance, "Kanagawa Prefecture" is selected from the prefecture names having been output, the lower-layer data of the selected prefecture "Kanagawa Prefecture", e.g., the names of the cities therein, are output as shown in FIG. 20(d). As a specific city such as "Yokohama City" is selected from the city names having been output, the data of the region including facility data corresponding to the selected city are specified. Then, a list of update target options corresponding to the map data in the specified region is output, and the user makes a selection from the list to ensure that the data corresponding to the specified target option are updated.

In the embodiment, various "categories" are output as the update target options. The categories may include, for instance, "background", "road", "network", "guidance" and "guide search".

If the category option "background" is selected, the data used to display roads, rivers, railways, geographical names and the like are specified as the update target data. The background data used to display roads are used strictly for road display and do not contain any data that can be used for route calculation. These data are used when displaying a road map but are not used in a route search. In addition, if the category option "road" is selected, road information used for map matching or route calculation is specified as the update target data. If a map matching function is not available in the navigation system or an area over which map matching is disabled is specified, the navigation system can automatically switch to a display in which the category option "road" cannot be selected and in such a case, a user-friendly system that can be operated with ease even by users with no expertise in the navigation-related technology is achieved.

If the category option "network" is selected, node information and information indicating the connections between nodes, which can be utilized in a route search, are specified as the update target data. If the category option "guidance" is selected, display information corresponding to the display to be provided when guiding the vehicle along the route, i.e., the information output on behalf of the driver to help him drive the vehicle along the route, is specified as the update target data. For instance, the information is used to display a mark indicating a right turn at an intersection, a building or construction that may be used as a landmark and the like. It is desirable to keep the "background" data, the "road" data, the "network" data and the "guidance" data updated when a route guidance function in the navigation functions is utilized.

If the category option "guide search" is selected, information provided as a guide to various facilities such as restaurants, department stores and shops, a guide to various types of events and a guide to schools and the like is specified as the update target data.

As specific categories are selected and the "OK" button indicating completion of the selection is pressed in FIG. 20(e), locator data used to display the roads in the selected region, i.e., "Yokohama City", the route search data and the guidance data used to provide guidance for the driver to a specific facility or the like are specified as the update target. Then, the screen in FIG. 20(f) is brought up on display to allow the user to indicate whether or not the data corresponding to the selected categories are to be updated. The screen in FIG. 20(f) indicates the selected region "Yokohama City" and the corresponding update data volume and required length of update time and contains an operation screen in which the user can indicate whether or not the data are to be updated. "yes" in the operation screen indicates an update instruction, whereas "no" in the operation screen indicates an instruction for not executing an update. If "yes" is selected, an indicator indicating that the update operation is in progress and the state of progress of the update operation and an operating option "cancel" to be selected to halt the update operation are brought up on display, as shown in FIG. 20(g).

The user specifies a given administrative zone or district by specifying a prefecture or a municipality as described above. As the administrative zoning systems differs among individual countries, the user in a given country should be able to specify an administrative zone as defined in the administrative zoning system particular to the country.

Figure 21:
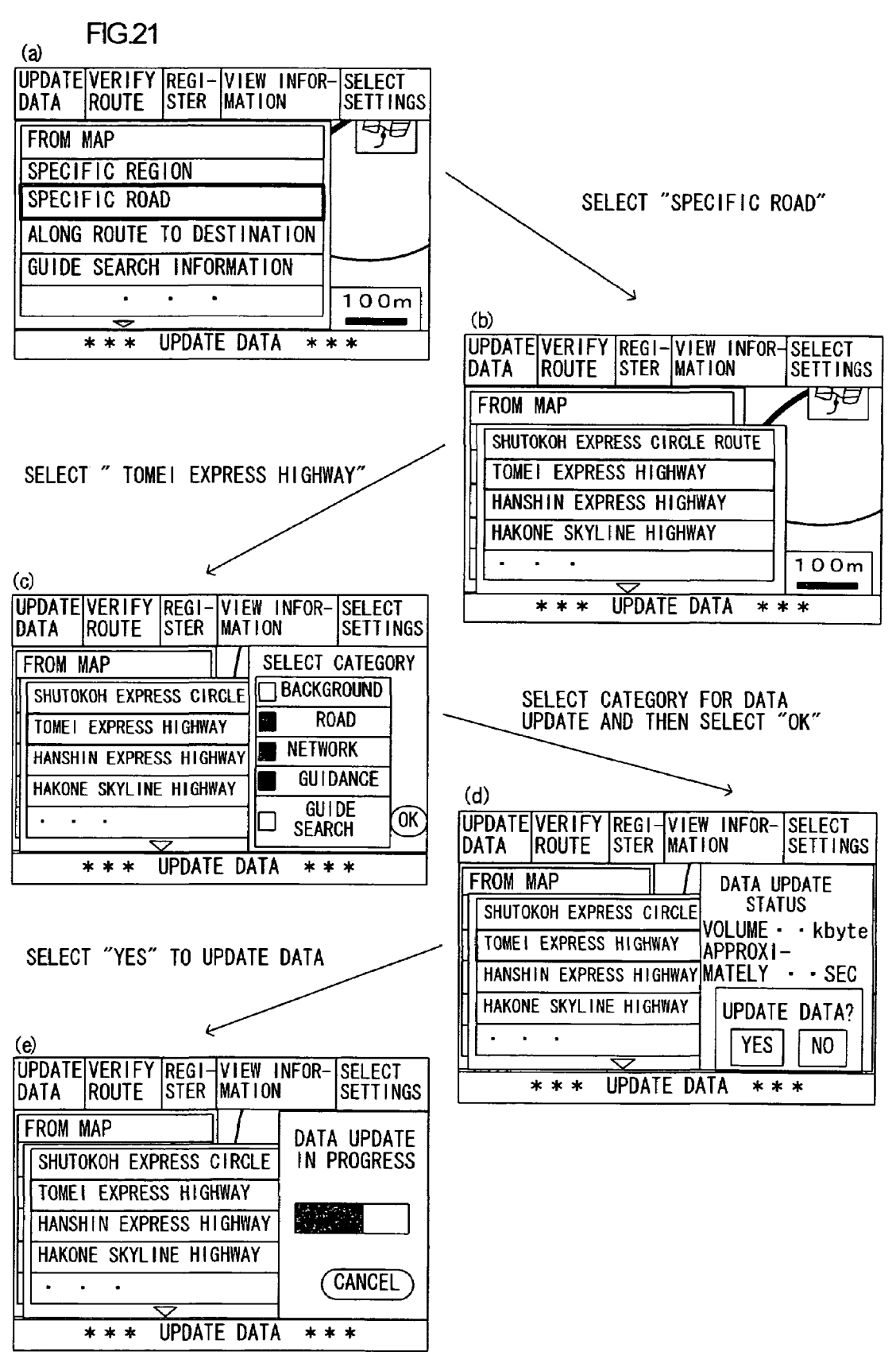

FIG. 21 shows how the screen display shifts when "specific road" is selected in the pulldown menu in FIG. 18(b).

When "specific road" is selected, the names of major roads in the map already selected and brought up on display are output, as shown in FIG. 21(b). The user then selects the road, the data of which he wishes to have updated from the output list of the road names shown in FIG. 21(b). In response, the types of data used to display the selected road are output. In this example, the data types are displayed in correspondence to the various data categories, e.g., "background", "road", "network", "guidance" and "guide search" (FIG. 21(c)). It is desirable to display data categories related to the specific road at this time. However, the user may become confused if unfamiliar data categories are displayed, and for this reason, the same data categories as those in FIG. 20(e) explained earlier are displayed in the embodiment. These data categories have already been described in detail.

As the user selects the categories of data to be updated from the output contents shown in FIG. 21(c), the operation screen in FIG. 21(d) indicating the update data volume and the length of time required for the update and prompting the user to indicate whether or not to execute the update is brought up on display. "yes" indicates an operation screen segment selected to issue an update instruction, i.e., an operation button pressed to issue the update instruction, whereas "no" indicates an operation screen segment selected to indicate that the update is not to be executed, i.e., an operation button pressed to indicate that the update is not to be executed. If the user selects "yes" indicating that the update is to be executed, the data update starts with the screen in FIG. 21(e) brought up on display. In the screen, the name of the road the data of which are being updated, a graph of the data being updated and an operation screen segment "cancel" to be selected to halt the operation are displayed. The graph of the data undergoing the update indicates the progress status of the update.

Greater ease of operation is achieved if the road names in the screen shown in FIG. 21(b) described earlier are indicated so that roads with new data available to be used for an update are visually distinguishable from roads, the data of which have already been updated or roads with no new data available for an update. Accordingly, they may be displayed in a visually distinguishable manner in the screen. Alternatively, the road names of roads with new data available to be used for an update alone may be output. When the navigation system shifts from the operation in FIG. 18 to the operation in FIG. 21 upon completing an data update in order to verify the update completion, the name of the road, the data of which have been updated is no longer displayed in an example of such a display mode. Alternatively, the road name may be displayed but in a manner that makes it possible to visually ascertain that the data of the road have been updated and that there are no more data to be updated, i.e., in a display mode different from the previous display mode. If there are no more data to be updated and no road names are displayed, the user may become confused. In order to avoid such confusion, the message "data of all roads are up-to-date" may be brought up on display.

Figure 22:
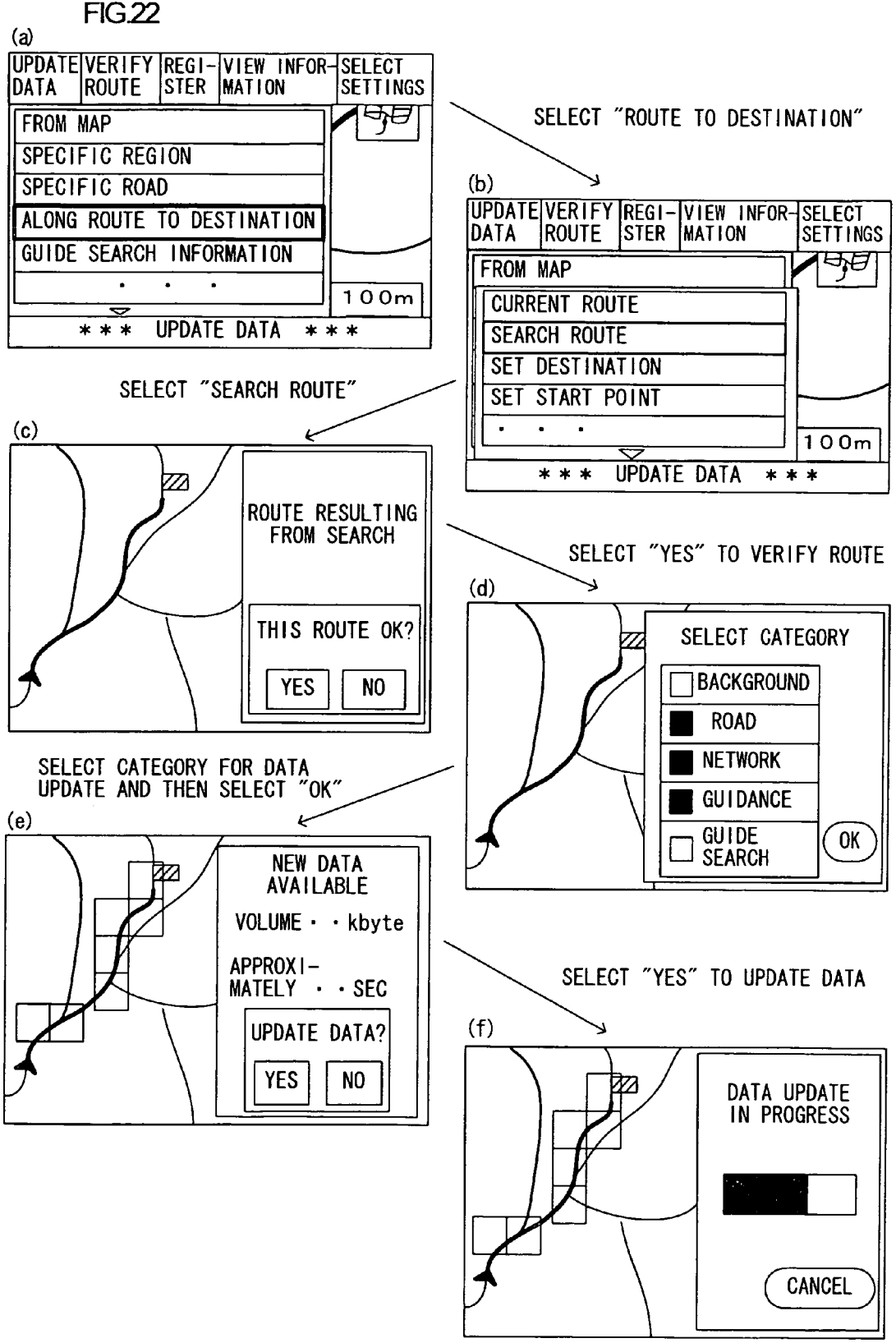
FIG. 22 is a screen transition diagram indicating how the screen display shifts during operation in the embodiment (when selecting data to be updated along a searched route)

FIG. 22 shows how the screen display shifts when selecting data to be updated based upon the results of a route search. FIGS. 16 and 17 present flowcharts of the corresponding processing procedure of the map management program provided for this purpose. FIG. 16 presents a flowchart of the operation executed at the navigation system 1, whereas FIG. 17 presents a flowchart of the operation executed at the map server 6.

As "data update" is selected in the menu bar at the top of the screen at the display monitor 18 and "along route to destination" is selected in the pulldown menu which appears after "data update" is selected, as shown in FIG. 22(a), the display shifts to the screen shown in FIG. 22(b). The screen in FIG. 22(b) includes a pulldown menu offering options "from current route", "route search", "set destination", "set start point" and " . . . ", which is to be used to specify the area for an update. If I user selects "route search" (S901) in order to update the data in a given area along a searched route, a route search is executed to determine the route to the destination and the route determined through the search is brought up on display. The results of the route search executed by the route information display unit 14 are provided in the screen shown in FIG. 22(c).

It is to be noted that the route search operation is executed differently (S902) depending upon whether it is executed at the navigation system 1 or at the map server 6. Namely, when the route search is executed at the map server 6, which already holds the latest versions of map data kept up-to-date, it only needs to receive the results of the route information search output by the map server 6 itself (S914), in response to a route search request issued from the navigation system 1, whereas when the route search is executed at the navigation system 1, the history information indicating the update history of the map data held at the navigation system 1 needs to be checked.

In more specific terms, the navigation system 1 receives route information and history information from the map server 6 (S903), and checks the map data version of the map data at the navigation system 1 (S904). If the results of the version check on the history α of the map data held at the navigation system 1 and the history β of the received route information indicate that the map data at the navigation system 1 are not the latest version ($\alpha<\beta$), the latest version of the area map corresponding to the route information need to be obtained by downloading from the map server 6 (S905). Under these circumstances, a message indicating that newer data, i.e., a newer version of data are available and a prompt for the user to enter his intent as to whether or not the data should be updated is brought up on display.

Then, the display shifts to the screen in FIG. 22(c) to indicate the results of the route search, and the operation shifts to a step in which the route along which the data are to be updated is specified. If the data along the route on display are to be updated, the user performs an operation to indicate that the route has been specified by, for instance, selecting "yes" in the screen. If "yes" is selected, the display shifts to the screen in FIG. 22(d) to confirm the search results indicating the route the data for which are to undergo the data update.

It is to be noted that if "no" is selected, another route candidate is displayed, and until the desirable searched route is confirmed, the verification operation is repeatedly performed (S906). It goes without saying that an operation button for halting the operation may be displayed so as to allow the user to halt the sequence of operations or to halt at least the operation starting with the screen display in FIG. 22(a) by selecting this operation button. In such a case, a higher degree of operational ease can be achieved when, for instance, a route lying along the desired road cannot be found through a route search, since the user can then promptly switch to an operation for finding the desired road from a different perspective.

The data along the specified route available for the update are indicated in the screen in FIG. 22(d). The data may be updated at this time by issuing an update instruction for the data in the update enabled area along the route brought up on display. In such a case, the data can be updated through a simple operation without placing a great onus on the user. If, on the other hand, it is more important to satisfy highly specific needs of individual users, a menu for category selection is brought up on display (S907) as in the operation corresponding to the display screen in FIG. 19(c), FIG. 20(e) or FIG. 21(c). As the user selects a single category or a combination of categories of data to be updated as in the operation corresponding to the screen display in FIG. 19(c), FIG. 20(e) or FIG. 21(c) and clicks the OK button, the display shifts to the screen shown in FIG. 22(e) (S908).

If "background" is selected at this time, background update data are obtained (S909), if "road" is selected, road update data are obtained (S910), and if "network" is selected, network update data are obtained (S911). It is to be noted that the meshes in the map containing data to be updated may be displayed in the screen in FIG. 22(d) so as to allow the user to select the desired category by checking the map meshes. Such a display helps the user make an appropriate decision as to whether or not a given mesh is crucial to the user.

Next, as shown in FIG. 22(e), the update target meshes related to the selected categories are displayed in the screen.

Namely, a road map reflecting the data update status, which indicates the results of the search executed in units of individual meshes, is displayed. It is to be noted that the information transfer control unit 233 has the function of obtaining the route information and the update history information by issuing a request for a route search to the map server 6, taking in map data containing the latest route information from the map server 6 by comparing the update history information thus obtained with the update history information corresponding to the map data held at the navigation system 1 and reflecting the map data thus taken in on the route information.

In addition, the highlight display unit 231 achieves a highlighted display of an area over which new data (road) are available to enable visual differentiation of the area, e.g., in a different color or as a flashing display based upon the map displayed following the route search and the selected update categories. The volume of the data to be used for the update, the length of data transfer time and the like are also indicated to provide the user with useful information during the verification (S912: as to whether or not the data are to be updated). The screen also includes display of operation buttons to be used by the user to indicate whether or not the map is to be updated.

If the user issues an instruction for a map update, i.e., if he presses the operation button "yes", the display shifts to the screen shown in FIG. 22(f) to indicate the progress of the data update in real-time with an elevator icon while the map data update unit 132 actually updates the map data (S913).

FIG. 17 presents a flowchart of the processing procedure executed in conformance to the map data management program installed in the map server 6.

In the flowchart in FIG. 17, as the map server 6 receives a data update request transmitted from the navigation system 1 as the OK button is clicked at the navigation system (S01), the map server 6 ascertains the update categories selected and specified in the update category menu (S102). If the category "background" has been selected, the map server 6 searches for update data related to the background in units of meshes by referencing the map data database 7 (S103), if the category "road" has been selected, the map server 6 searches for road update data in units of meshes (S104), if the category "network" has been selected, the map server 6 searches for network update data in units of meshes (S105) and it then transfers the data obtained through the search via the update data provider unit 63 (S106).

In addition, although not shown, if the category "guide search" has been selected, the map server searches for update data related to guide search in units of meshes by referencing the guide search data database 8 and transfers the update data via the update data provider unit 63.

Namely, the map data management unit 62 manages the map data in units of individual meshes, executes a search of an area to which the subject map data belong via the update data provider unit 63 and provides the update data together with the corresponding history information.

Figure 23:
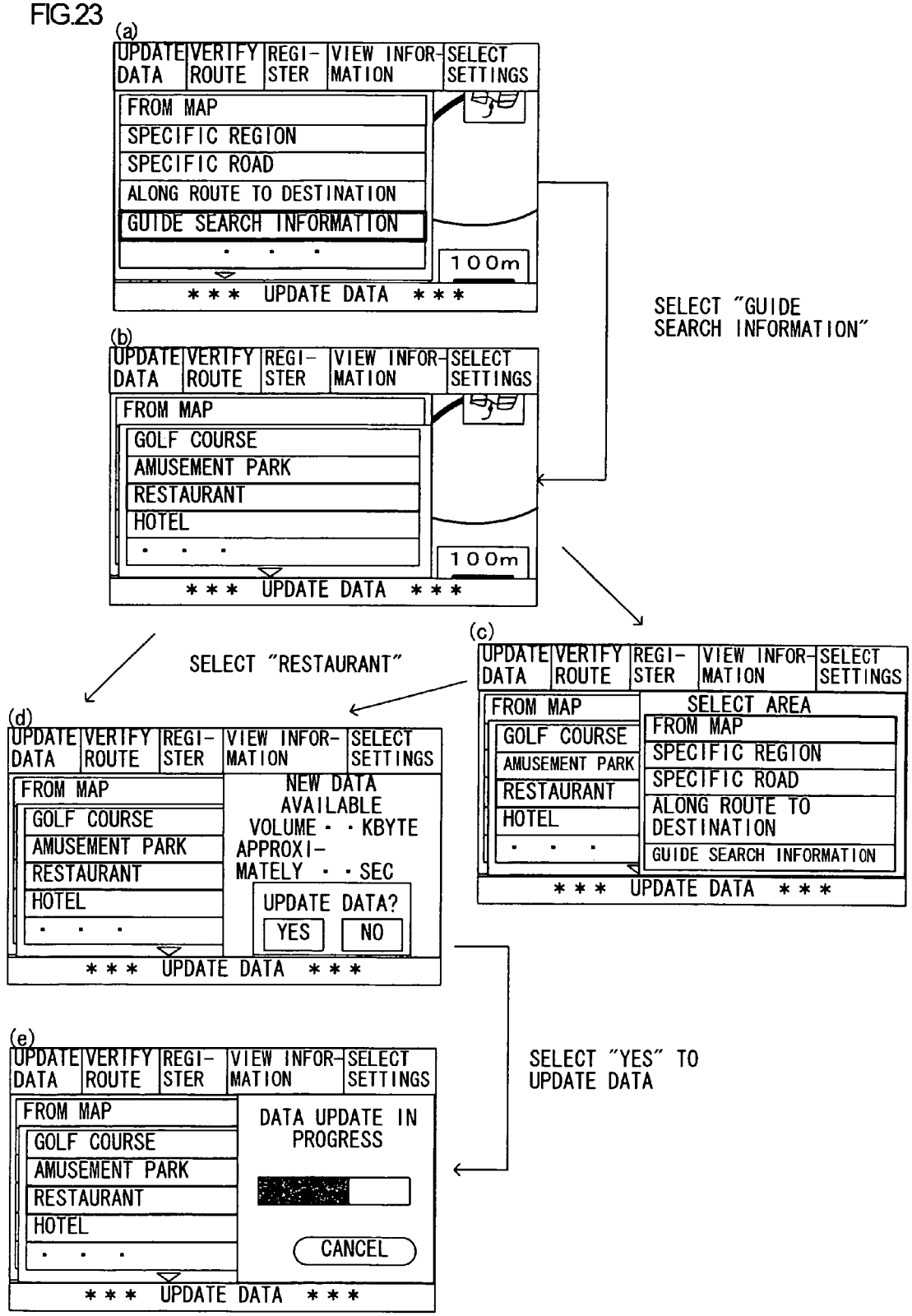
FIG. 23 is a screen transition diagram indicating how the screen display shifts during operation in the embodiment (when selecting data to be updated from guide search information)

FIG. 23 shows how the screen display shifts when "guide search information" is selected in the pulldown menu. As "guide search information" is selected in the menu in the screen shown in FIG. 23(a), a list of guide search information options (golf courses, parks, restaurants, hotels, etc.) is displayed, as shown in FIG. 23(b). If, for instance, "restaurant" is selected from the guide list options, the display shifts to the screen in FIG. 23(c). In the screen in FIG. 23(c), the guide list option "restaurant" is highlighted, and a menu listing update methods (update area selection methods) similar to that shown in FIG. 18 is displayed on the right side of the screen. The user then selects a specific category ("from map", "specific region", "specific road" . . . ) and the update area is specified through map-based selection, region-based selection or the like, as has been explained in reference to FIGS. 18 through 22, before the display shifts to the screen in FIG. 23(d). The screen in FIG. 23(d) indicates whether or not any new data corresponding to a specific category in the guidance option "restaurant" are available. FIG. 23(d) shows that there are new data available in the selected category. If the user selects "yes" thereby issuing an update instruction in the data update screen in FIG. 23(d), the update is executed as indicated in FIG. 23(e). It is to be noted that if the user does not wish to further specify a more definite area or does not wish to alter the area from that on display, as shown in FIG. 23(b), a selection may be made from the list in FIG. 23(b) and then the display may shift directly to the screen in FIG. 23(d).

Figure 24:
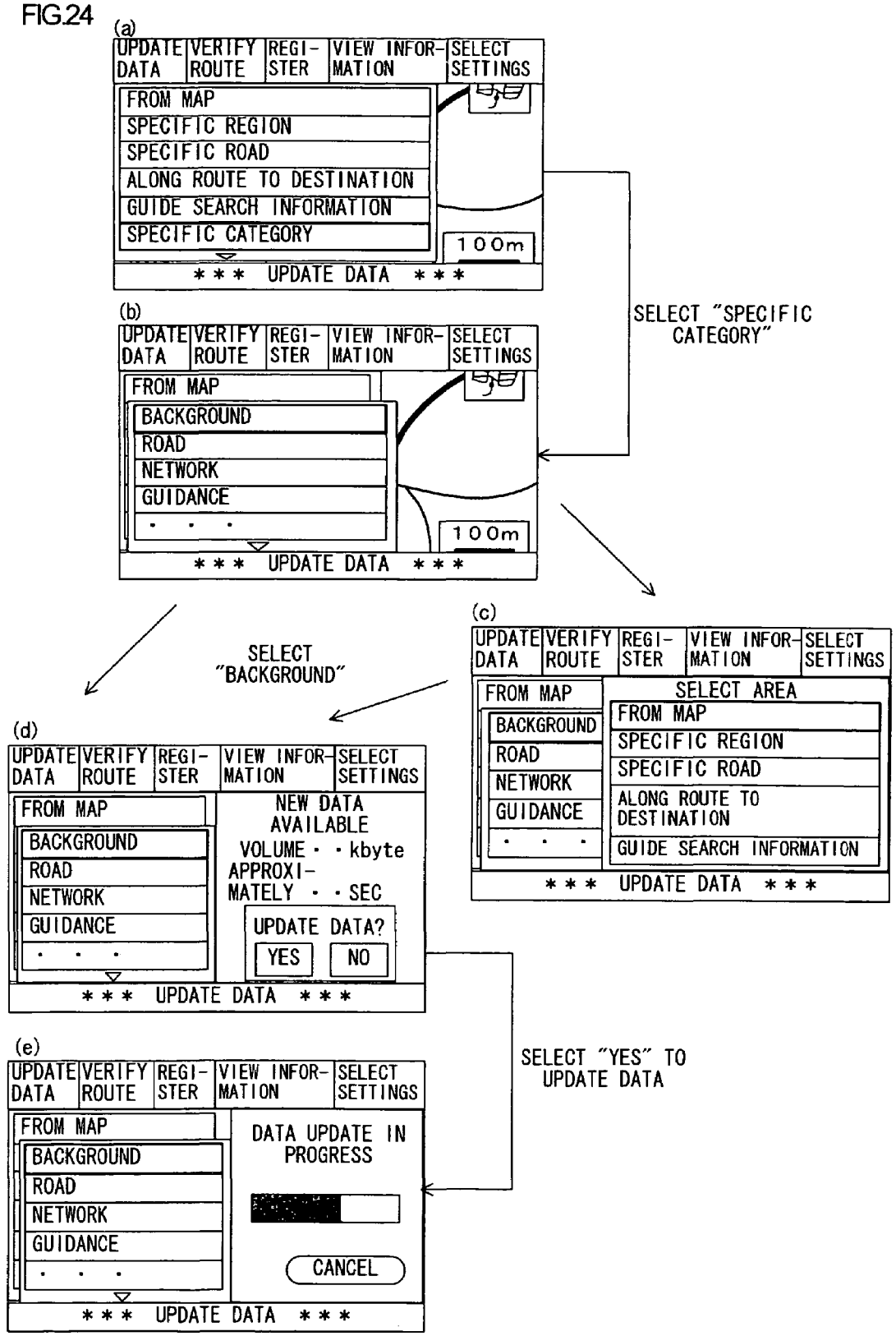
FIG. 24 is a screen transition diagram indicating how the screen display shifts during operation in the embodiment (when selecting data to be updated in a specific category).

In addition, FIG. 24 shows how the screen display shifts when "specific category" is selected in the pulldown menu. As the user selects "specific category" in the screen shown in FIG. 24(a), a category list is brought up on display as shown in FIG. 24(b). Once the user selects an update target in the category list, the display shifts to the screen shown in FIG. 24(c). In the screen shown in FIG. 24(a) the update area is specified through map-based selection, region-based selection or the like as explained earlier in reference to FIG. 18 (FIG. 24(c)). The update area is specified in a manner similar to that explained earlier in reference to FIGS. 18 through 22. The screen in FIG. 24(d) indicates whether or not there are any new data available over the selected area in correspondence to the selected category. Alternatively, the update screen may be brought up on display only if new data are available over the selected area in correspondence to the selected category.

As the user issues an update instruction in the screen in FIG. 24(d), i.e., when the availability of update data related to "background" is confirmed on display and the user selects "yes" thereby issuing an update instruction, the data update is executed while the screen in FIG. 24(e) is on display. The screen on display at this time indicates the specific update target, indicates that the update operation is in progress and also indicates the progress status of the update operation, as has been explained earlier. In addition, if the region on display in the screen in FIG. 24(b) is designated as the update target or the target area is to remain unchanged, the display may shift directly from the screen in FIG. 24(b) to the screen in FIG. 24(d).

As explained above, the following advantages are achieved by adopting the map data structure and the map data processing method achieved in the embodiment.

(1) Since map data can be updated in units of individual meshes, the entire recording medium, such as a DVD ROM, in which the map data are stored, does not need to be replaced with a new recording medium when the map data are partially updated. Since the minimum data update units are individual meshes, i.e., since data can be updated in units of individual sets of basic data and extension data, data that do not need to be updated are not updated and thus, the volume of data that need to be communicated (the communication cost) can be minimized. In addition, individual sets of basic data and extension data can be updated over varying cycles.

(2) Since update data can also be provided through communication via the Internet, the latest version of the update data can be made available quickly at low cost.

(3) Since the mesh data are divided into basic data and extension data, the map data can be commonly used in navigation systems that only require map display and navigation systems that also execute route search processing and guidance processing. In addition, the extension data are further divided by data types. Thus, update data assuming a uniform structure simply need to be provided even when only a specific type of extension data, but not other types of extension data, is required. The background data are managed separately from the other types of data such as the locator data and the network data. For this reason, a map can be drawn through a single access instead of having to access a plurality of groups of data such as the background, the roads and the text. Moreover, since the roads and their connections in the background can be displayed in a drastically simplified and exaggerated manner so as to achieve a reduction in the volume of the display data and an improvement in the display speed.

(4) Since the mesh data are divided into basic data and extension data, the map data can be provided from a single map database to simple systems such as portable telephones and high-end systems such as on-vehicle navigation systems alike. For instance, the basic data alone need to be provided to display a map and provide navigation at a portable telephone, whereas both the basic data and the extension data are provided to on-vehicle navigation systems.

(5) Data in adjacent meshes or at higher and lower levels are connected by using two-dimensional coordinate values corresponding to the latitudinal and longitudinal values, and thus, the data update method does not need to conform to a specific navigation system model or standard. Namely, two-dimensional coordinates corresponding to latitudinal and longitudinal values are universal data and by using such data, the data update method can be standardized.

(6) Since a supplementary parameter is used in addition to the two-dimensional coordinate values, the matching node can be identified with a high degree of reliability. For instance, by using height data as the additional parameter, even a connecting point at an intersection of elevated roads can be reliably distinguished. Furthermore, by using the coordinate values at the lower layer level as the additional parameter, a node or the like can be identified at the resolution at the lower layer level. In other words, the data at a higher level and a lower level with different scaling factors can be reliably connected.

(7) Since the map data are managed by storing the full mesh management information in the nonvolatile memory, the update data can be managed easily and reliably. As a result, program development for navigation systems and the like are facilitated.

(8) The method whereby the correct boundary node to connect with each boundary node is ascertained by searching for a boundary node with matching coordinate values in an adjacent mesh is only adopted in updated meshes instead of in all meshes, and boundary nodes in non-updated meshes are searched through the conventional pointer reference method. As a result, the data processing speed is not lowered unnecessarily.

(9) Since the update data for an area selected by the user are delivered and the user does not receive the update data for the entire nation delivered in a batch, the length of time required for the data reception is minimized. In addition, since the entire map data are not recorded into a large capacity read/write storage device, a storage capacity that allows only the update data requested by the user to be stored will suffice.

(10) In the explanation of the embodiment provided above, the extension coordinate value a, which is a parameter that may be constituted with the height data indicating the height of the node or the time data (information) related to the data generation/update, is set as part of a level correspondence key. Such an extension coordinate value a does not need to be provided in correspondence to all the boundary nodes present at mesh boundaries, and instead, the extension coordinate value a may be set only in conjunction with some of the boundary nodes for a specific reason. For instance, the extension coordinate value a may be attached to boundary nodes with matching coordinates that intersect on a mesh boundary, so as to minimize the extent of an increase in the data volume and maintain the data processing speed at the highest possible level.

(11) When updating map data, a specific area over which the map data are to be updated is selected in a menu screen on display, and thus, the area for the data update can be specified with ease. In addition, since only the data in a crucial area are updated instead of all the data for which update data are available, the data update can be completed faster and the cost of the data update can be reduced.

(12) Since the user is allowed to select the update target from the map meshes on display at the monitor 18 alone, the latest version of the map can be displayed and, in addition, the data update can be completed faster and at lower cost.

(13) A mesh to undergo a data update can be selected by, for instance, specifying administrative zone names such as a prefecture name and a municipality name through a region-based selection. As a result, the map data of the desired region can be updated to the latest version with ease and at low cost.

(14) A mesh to undergo a data update can be selected by specifying the name of a route or a road and, as a result, the update target can be selected quickly if the user already knows the name of the route or the road the data of which he wishes to update. Instead of limiting the selection range to the names of routes and roads in the map currently on display, the user may be allowed to make a selection from the names of routes and roads in the entire nation. For instance, a list of express highways in the entire nation may be brought up on display after the user selects a category "express highway" so that the user can have the data in all the meshes through which a given express highway, e.g., Tomei Express Highway, selected by the user passes updated. The user may be allowed to enter an unofficial name by which a given road or route is known as well as the official name of the road, such as the National Highway No. 1. He may also be allowed to enter a traditional name by which a given road is known, e.g., Oumekaido.

(15) The map data in meshes along the route from the start point (the current position) to the destination, which is first determined, can be updated to the latest version. As a result, the map display and the vehicle guidance can be provided by using the latest map data. In addition, a route search may be re-executed with the updated data so as to determine the final route based upon the latest version of map data. When the map data along the route are updated, meshes with update data available along the route can be highlighted in the display. Thus, the user can easily check the range over which the map data are to be updated. The user may even select a mesh with data that absolutely need to be updated among the highlighted meshes. In this manner, the absolute minimum volume of latest map data can be obtained within the shortest possible length of time at minimum cost. A further selection may be made from the highlighted meshes both when updating map data in the map on display and when updating map data through region-based selection. In such a case, the selected mesh is displayed with further emphasis so that it can be distinguished from the other meshes.

(16) When updating map data, the volume of the update data and the length of time required for the data update are also indicated to allow the user to make a decision as to whether or not to update the data. For instance, if the data update is to take a long time and the updated data are not going to be needed soon, the information provided on display helps the user to make a quick decision to update the data at a later, more convenient time.

(17) Since map data can be updated by selecting a specific category (update data type) such as background data, road data, network data, guidance data or guide search data, the smallest possible volume of update data that is absolutely necessary can be selected. It is to be noted that the category selection may be performed either before or after specifying the update area.

While an explanation is given above in reference to the embodiment on an example in which the control program executed by the control device 11 of the navigation system is stored in a ROM, the present invention is not limited to this example. The control program and an installation program used to install the control program may be provided in a recording medium such as a DVD. It is to be noted that the recording medium does not need to be a DVD, and instead, it may be any of various types of recording media including a CD ROM and magnetic tape.

In addition, these programs may be provided via a transmission medium such as a communication line, a typical example of which is the Internet. Namely, the programs may be converted to signals on a carrier wave through which a transmission medium is carried. When providing the programs in a recording medium or via the Internet, they can be provided to the navigation system in a configuration identical to that shown in FIG. 1. For instance, the recording medium 2 may be used as a recording medium in which the programs are provided and the map server 6 may be used as a server that provides the application program. Thus, the programs can be distributed as a computer-readable computer program product adopting any of various modes such as a recording medium and a carrier wave.

Furthermore, a car navigation system may be achieved by executing the control program described above on a personal computer. In such a case, the current position detection device 13, the input device 19 and the like should be connected to specific I/O ports or the like of the personal computer.

While an explanation is given above in reference to the embodiment on an example in which update data are provided from the removable memory 3, the present invention is not limited to this example. Instead, update data may be written into a CD ROM or a DVD ROM and then be provided by temporarily replacing the recording medium 2 with the CD ROM or the DVD ROM.

While an explanation is given above in reference to the embodiment on an example in which the initial map data are read from the recording medium 2, the present invention is not limited to this example. The initial map data may be received via the Internet 5, stored into the non-volatile memory 12 and then used and managed as update data by adopting the method described earlier. In addition, map data may be received via the Internet as they become needed, the received map data may be stored into the non-volatile memory 12 each time, and they may be updated and managed through the method described earlier whenever it becomes necessary to update them.

While an explanation is given above in reference to the embodiment on an example in which the route search is executed in the navigation processing, the present invention is not limited to this example. Any of various other types of navigation processing including map display and route guidance can be executed by using the map data described above.

While an explanation is given above in reference to the embodiment on an example in which the nonvolatile memory 12 is installed inside the navigation system 1, the present invention is not limited to this example and the nonvolatile memory 12 may instead be an external storage device which is connected through a cable or the like.

While an explanation is given above in reference to the embodiment on an example in which the background (for map display) data constitute basic data and the network data constitute extension data, the present invention is not limited to this example. For instance, the network data may instead be designated as basic data if map data (the network data and the like) are utilized in an application in which no map is displayed. More specifically, the network data may be used as basic data in an application in which a route search is executed and guidance for the vehicle is provided along the advancing direction with an arrow or the like alone, since no background data for map display) are required in such a navigation system. In this case, the network data are the data with the highest priority, and the network data alone may be updated in units of individual meshes. Namely, the map data with the highest priority that are commonly used in a plurality of specific model types should be used as the basic data in a given application.

While the invention has been particularly shown and described with respect to a preferred embodiment thereof by referring to the attached drawings, the present invention is not limited to these examples and it will be understood by those skilled in the art that various changes in form and detail may be made therein without departing from the spirit, scope and teaching of the invention.

The invention claimed is:

1. A navigation method for providing navigation by using map data, comprising:
   displaying a menu with which a user specifies an area of a map over which map data are to be updated, the menu containing a map-based option for area specification and a route-based option for area specification, the map data being managed in units of a mesh;
   displaying a route and a map including the route, and displaying along the route one or more meshes including map data judged to be updated based upon the route, when the route-based option is selected from the options in the menu on display;
   making a display in which a data update instruction can be inputted;
   obtaining update data along the route when the data update instruction is input; and
   executing processing by using the obtained update data.

2. A navigation method according to claim 1, wherein:
   the meshes are displayed so that a mesh is selectable for updating among the meshes displayed along the route.

3. A computer-readable recording medium on which is stored a program that enables a computer to perform a navigation method according to claim 2.

4. A computer-readable recording medium on which is stored a program that enables a computer to perform a navigation method according to claim 1.

5. A navigation method to be used in a navigation system that uses map data stored in a fixed recording medium and update map data downloaded from a map data management apparatus in combination, comprising:
   a step of prompting a selection in a map data update menu prepared in advance, obtaining an input indicating the selection and displaying a specific area for a data update;
   a step of prompting an input of at least one selected option in an update category menu prepared in advance and displaying the specific area distinguishably when the specific area is judged to have update map data based upon the input of the selected option;

making a display in which a map data update instruction can be inputted;

obtaining the update map data of the specific area having the update map data when the map data update instruction is input; and using the obtained update map data.

6. A computer-readable recording medium on which is stored a program that enables a computer to perform a navigation method according to claim 5.

7. A navigation device, comprising:

a control unit that is configured to provide navigation by using map data, wherein the control unit is configured to display a menu with which a user specifies an area of a map over which map data are to be updated, the menu containing a map-based option for area specification and a route-based option for area specification, the map data being managed in units of a mesh;

to display a route and a map including the route, and displaying along the route one or more meshes including map data judged to be updated based upon the route, when the route-based option is selected from the options in the menu on display;

to make a display in which a data update instruction can be inputted;

to obtain update data long the route when the data update instruction is input; and to execute processing by using the obtained update data.

8. A navigation device according to claim 7, wherein:

the control unit is configured to display the meshes so that a mesh can be selected to be updated among the meshes displayed along the route.

9. A navigation device, comprising:

a control unit that is configured to use map data stored in a fixed recording medium and update map data downloaded from a map data management apparatus in combination, wherein the control unit is configured to prompt a selection in a map data update menu prepared in advance, obtain an input indicating the selection and display a specific area for a data update;

to prompt an input of at least one selected option in an update category menu prepared in advance and display the specific area distinguishably when the specific area is judged to have update map data based upon the input of the selected option;

to make a display in which a map data update instruction can be inputted;

to obtain the update map data of the specific area having the update map data when the map data update instruction is input; and to use the obtained update map data.

* * * * *

UNITED STATES PATENT AND TRADEMARK OFFICE
CERTIFICATE OF CORRECTION

PATENT NO. : 7,584,049 B2  Page 1 of 1
APPLICATION NO. : 10/521327
DATED : September 1, 2009
INVENTOR(S) : Takashi Nomura It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 911 days.

Signed and Sealed this

Fourteenth Day of September, 2010

David J. Kappos
*Director of the United States Patent and Trademark Office*